US008384584B2

(12) United States Patent
Karr

(10) Patent No.: US 8,384,584 B2
(45) Date of Patent: Feb. 26, 2013

(54) REDUCED COMPUTATION COMMUNICATION TECHNIQUES FOR LOCATION SYSTEMS

(75) Inventor: Lawrence J. Karr, Santa Monica, CA (US)

(73) Assignee: RoundTrip LLC, Sylmar, CA (US)

( * ) Notice: Subject to any disclaimer, the term of this patent is extended or adjusted under 35 U.S.C. 154(b) by 236 days.

(21) Appl. No.: 12/964,832

(22) Filed: Dec. 10, 2010

(65) Prior Publication Data

US 2012/0146834 A1 Jun. 14, 2012

(51) Int. Cl.
*G01S 13/74* (2006.01)

(52) U.S. Cl. ............................................ 342/44; 342/51

(58) Field of Classification Search ............... 342/42–51
See application file for complete search history.

(56) References Cited

U.S. PATENT DOCUMENTS

| 5,055,849 | A | * | 10/1991 | Andersson et al. | ........... 342/104 |
|---|---|---|---|---|---|
| 5,432,521 | A | | 7/1995 | Siwiak et al. | |
| 5,576,716 | A | | 11/1996 | Sadler | |
| 5,745,072 | A | * | 4/1998 | Jensen et al. | ................... 342/104 |
| 5,777,580 | A | | 7/1998 | Janky et al. | |
| 7,573,381 | B2 | | 8/2009 | Karr | |
| 7,592,918 | B2 | | 9/2009 | Karr | |
| 7,646,330 | B2 | | 1/2010 | Karr | |
| 7,791,470 | B2 | | 9/2010 | Karr | |
| 2002/0145557 | A1 | | 10/2002 | Roy et al. | |
| 2008/0102859 | A1 | | 5/2008 | Karr et al. | |
| 2008/0174481 | A1 | | 7/2008 | Bryant et al. | |
| 2009/0201152 | A1 | | 8/2009 | Karr et al. | |
| 2010/0066531 | A1 | | 3/2010 | Karr | |

\* cited by examiner

*Primary Examiner* — Timothy A Brainard
(74) *Attorney, Agent, or Firm* — Gifford, Krass, Sprinkle, Anderson & Citkowski, P.C.

(57) ABSTRACT

Techniques are generally disclosed for communications between a locator device and a transponder device. The locator device may be located in a space based location such as on a surface of a remote celestial body, on a space craft or space station, on a satellite, or on a low earth orbit aircraft. The locator can encode an interrogation signal for receipt by one or more distant transponders. The transponder devices can receive the communications from the distant locator device and determine frequency, phase, cadence, and Doppler for encoding a reply transmission to the locator device. The encoding process estimates Doppler shift and adapts the reply transmission for a quantized reverse Doppler shifted frequency and cadence, which effectively pre-compensates for the Doppler shift that will be apparent to the locator due to the relative velocity. The locator can use the Doppler quantization scheme to reconstruct the actual relative velocity.

40 Claims, 18 Drawing Sheets

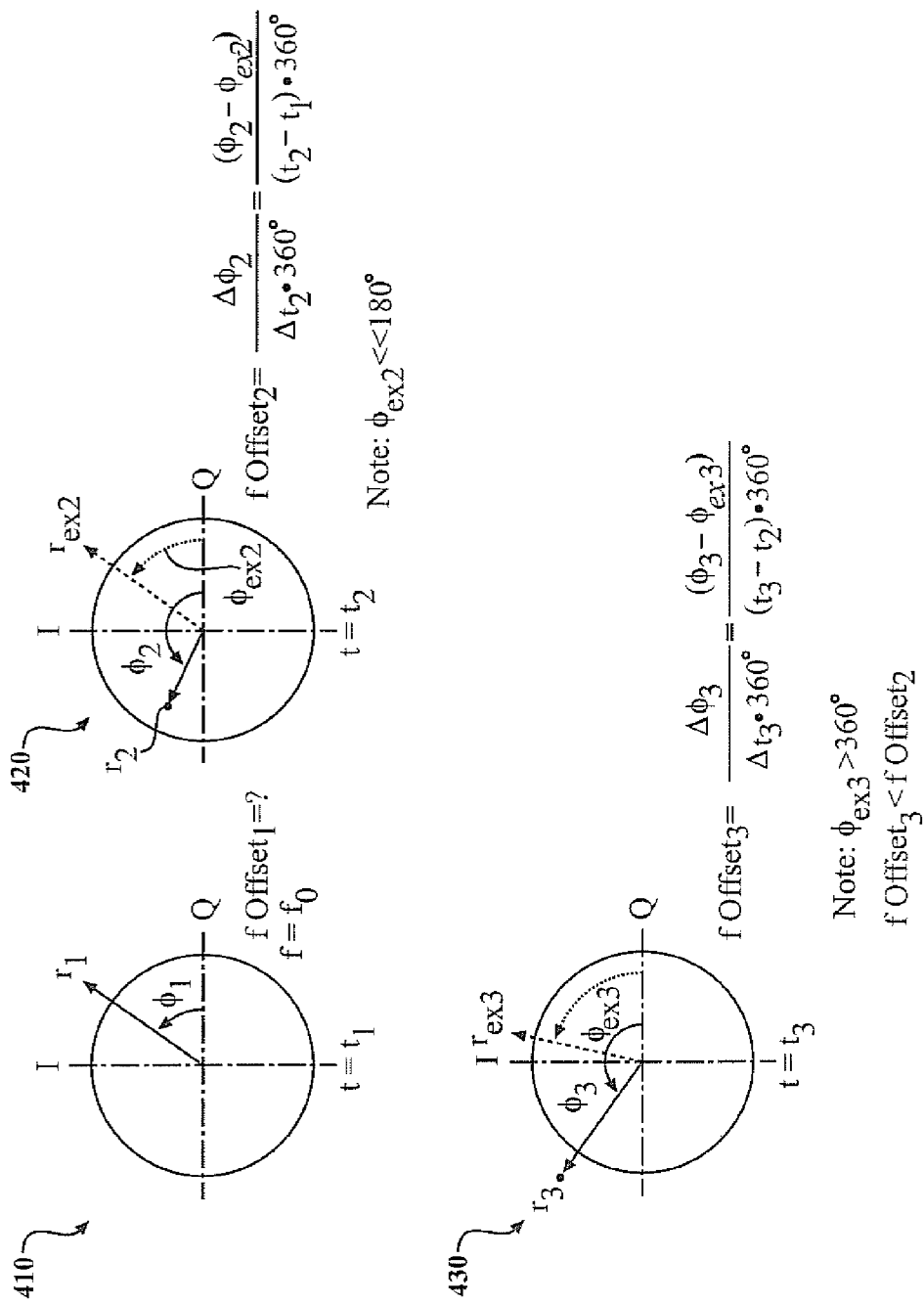

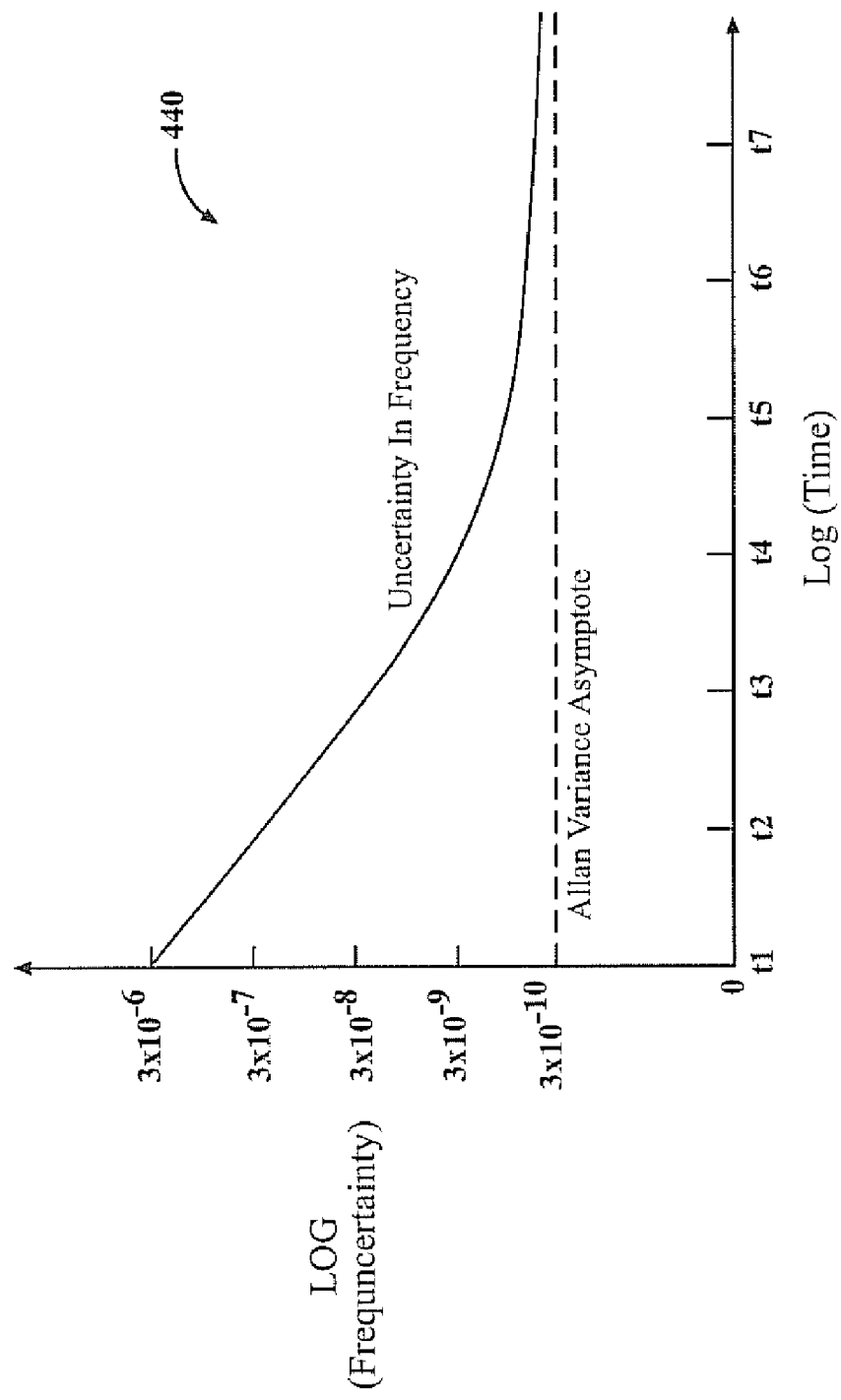

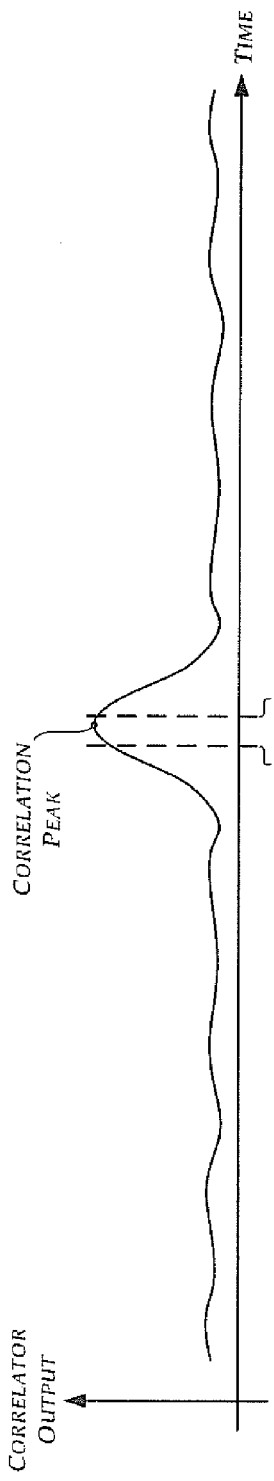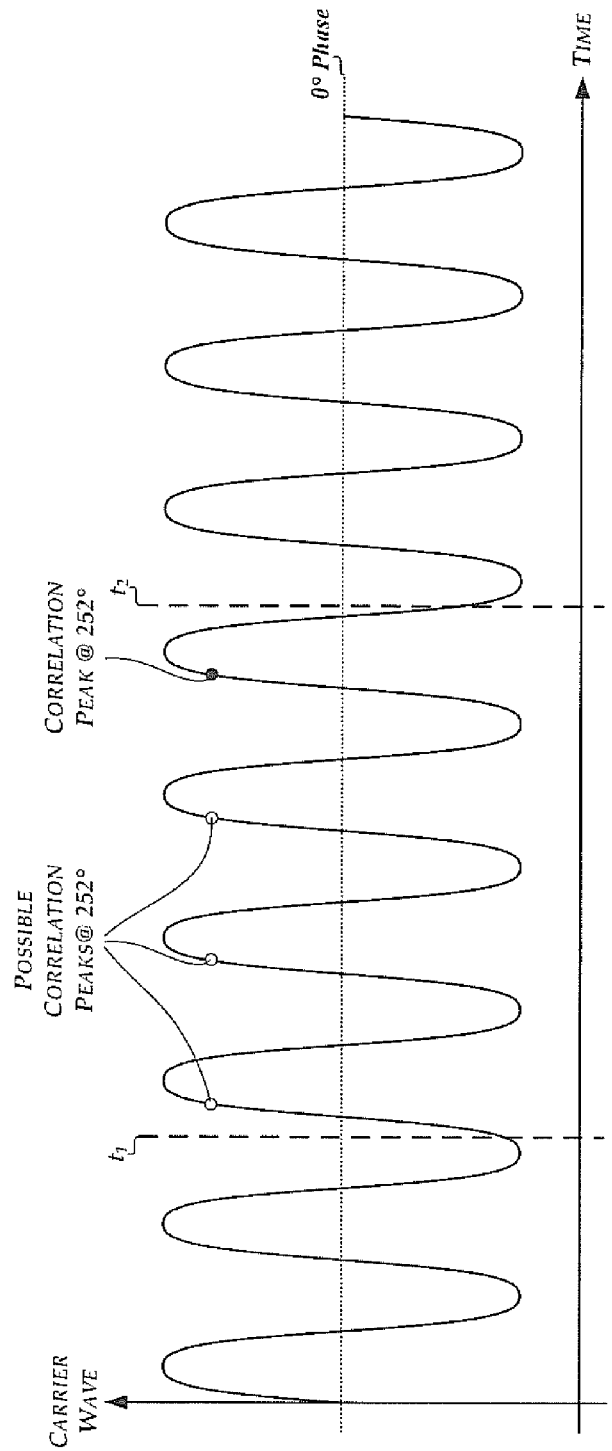

REDUCED COMPUTATION COMMUNICATION TECHNIQUES FOR LOCATION SYSTEMS

FIELD OF THE INVENTION

Techniques that can be used for communications between a locator device and a transponder device are generally disclosed. The encoding process for transmissions are adapted to estimate Doppler shift and adapt the transmissions with a reverse Doppler shifted frequency/phase that effectively pre-compensates for the Doppler shift that will be apparent to the locator due to the great distance and relative velocity between the locator and the transponder.

BACKGROUND OF THE INVENTION

Some methods for locating an object are known in the art. A missing vehicle locator system is described in U.S. Pat. No. 5,418,537 issued to Bird. The vehicle locator system uses one or more GPS systems in conjunction with a GPS antenna, a receiver/transmitter, a telephone with associated antennas, and a modem mounted in a vehicle whose position is to be monitored. A paging request is issued and received by a paging responder in the vehicle. The paging request causes the modem to interrogate the GPS receiver to determine the current position of the vehicle. The current position of the vehicle is transmitted via a cellular telephone link to notify a vehicle location service center of the current location of the vehicle. Other known location determination techniques include the use of a Loran or a Glonass satellite based system.

Another object location system is described in U.S. Pat. No. 5,576,716 to Sadler for locating lost or stolen property. This location system includes a GPS module, a microcomputer, a modem, and a telephone, all of which must be installed in the vehicle. The system described regularly and automatically computes the position of the property for transmission via the phone link to a central receiver/transmission station.

The present applicant has developed various technologies related to communications between locators and transponders as is described in the following issued U.S. patents and published U.S. patent applications: U.S. Pat. No. 7,791,470, titled "SPIN AROUND DIRECTION AND DISTANCE LOCATOR," and issued on Sep. 7, 2010; U.S. Pat. No. 7,646,330 "SYSTEM AND METHOD FOR LOCATING OBJECTS AND COMMUNICATING WITH THE SAME," and issued on Jan. 12, 2010; U.S. Pat. No. 7,592,918, titled "ELECTRONIC FENCE MODE ALERT SYSTEM AND METHOD," and issued on Sep. 22, 2009; U.S. Pat. No. 7,573,381, titled "REVERSE LOCATOR," and issued on Aug. 11, 2009; U.S. Published Application 2010/0066531, titled "LOCATOR INVENTORY SYSTEM," and filed on Sep. 12, 2009 as U.S. patent application Ser. No. 12/210,115; U.S. Published Application 2009/0201152, titled "ANTI-TAMPER CARGO CONTAINER LOCATOR SYSTEM," and filed on Nov. 26, 2008 as U.S. patent application Ser. No. 12/324,615; and U.S. Published Application 2008/0102859, titled "LOCATION OF COOPERATIVE TAGS WITH PERSONAL ELECTRONIC DEVICE," filed on Oct. 25, 2007 as U.S. patent application Ser. No. 11/924,553.

SUMMARY OF THE INVENTION

This inventions resides in apparatus, methods and systems associated with communications between a locator device and a transponder device, as well as the devices themselves.

The locator can encode an interrogation signal for receipt by one or more transponders despite great distances and high relative velocities. The transponder devices can receive the communications from the distant locator device and determine frequency, phase, cadence, and Doppler for encoding a reply transmission to the locator device. The encoding process estimates Doppler shift and adapts the reply transmission for a quantized reverse Doppler shifted frequency and cadence, which effectively pre-compensates for the Doppler shift that will be apparent to the locator due to the relative velocity. The locator can use the Doppler quantization scheme to reconstruct the actual relative velocity. The locator device may be located in a space based location such as on a surface of a remote celestial body, on a space craft or space station, on a satellite, or on a low earth orbit aircraft.

A method for locating a transponder (MT) with a remote locator (RL) according to the invention includes the step of transmitting, by the RL, an interrogation signal including an interrogation sequence that is encoded with a specific identifier associated with the MT. The MT captures samples associated with the interrogation signal with a receiver in the MT to determine if the captured samples correspond to the interrogation signal encoded with the specific identifier associated with the MT. If the interrogation signal is determined to be encoded with the specific identifier associated with the MT, the MT determines a quantized Doppler measurement associated with the interrogation signal and adjusts the transmission characteristics of a transmitter in the MT with the quantized Doppler measurement such that twice the quantized Doppler measurement is effectively subtracted from the carrier frequency and cadence of the transmitter.

The MT selects a reply sequence for transmission. The MT encodes a Doppler compensation factor in a coded message for transmission in at least a portion of the reply sequence, and transmits the reply sequence with the coded message as a reply signal. The RL captures samples associated with the reply signal with a receiver in the RL to determine if the captured samples correspond to the reply signal from the MT. When the reply signal is determined to be from the MT the MT extracts the Doppler compensation factor from the coded message associated with the reply signal, and determines a Doppler shift associated with the reply signal using the Doppler compensation factor extracted from the coded message.

A direction from the RL to the MT may then be determined in accordance with the Doppler shift associated with the reply signal. The method may further comprise the step of determining, by the RL, a distance between the RL and the MT based on the roundtrip time of flight between the transmission of the interrogation signal and the receipt of the reply signal. The location of the MT may then be determined in accordance with a known location of the RL and the determined direction and distance from the RL to the MT.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 4A and 4B are diagrams illustrating the timing acquisition for an example secure communication system;

FIGS. 5C-5D are diagrams illustrating example correlation peaks for an example receiver;

DETAILED DESCRIPTION OF THE INVENTION

Figure 1A:
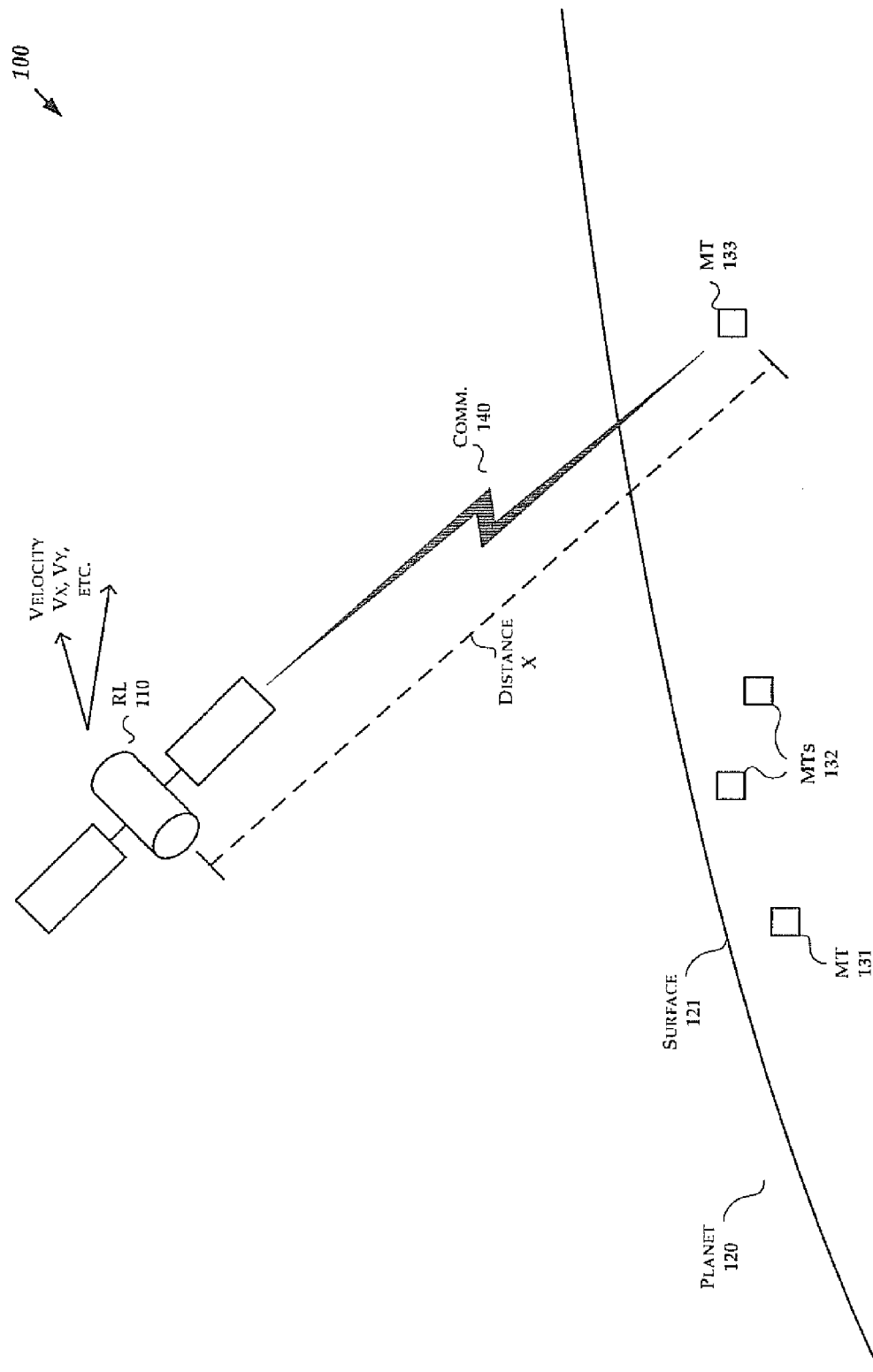
FIG. 1A illustrates an example operating environment.

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Throughout the specification, and in the claims, the term "connected" may mean a direct electrical connection between the things that are connected, without any intermediary devices. The term "coupled" may mean either a direct electrical connection between the things that are connected or an indirect connection through one or more passive or active intermediary devices. The term "circuit" may mean one or more passive and/or active components that are arranged to cooperate with one another to provide a desired function. The term "signal" may mean at least one current signal, voltage signal, electromagnetic wave signal, or data signal. The meaning of "a", "an", and "the" may include plural references. The meaning of "in" may include "in" and "on".

Briefly stated, techniques that can be used for communications over great distances and relative velocity differences between a locator device and a transponder device are generally disclosed. The locator device may be located in a space based location such as on a surface of a remote celestial body, on a space craft or space station, on a satellite, or on a low earth orbit aircraft. The locator is adapted to encode the interrogation signal for receipt by one or more distant transponders. The transponder devices can be adapted to receive the communications from the distant locator device and determine frequency, phase, cadence, and Doppler for encoding a reply transmission to the locator device. The encoding process estimates Doppler shift in the return transmission and adapts the reply transmission for a reverse Doppler shifted frequency/phase, which effectively pre-compensates for the Doppler shift that will be apparent to the locator due to the great velocity differences.

The locator may also be referred to herein as a remote locator. The term "remote" is intended to imply that the locator device is separated from the transponder by some unknown distance, but is not intended to be limiting. In some examples, the locator device can correspond to a portable device such as a small form factor handheld device, or some other device that may be affixed to a moving vehicle such as an air craft, space craft, satellite or space station. In some other examples, the locator may correspond to a stationary device such as a base station on the surface of a celestial body. These examples are not intended to be limiting and any appropriate device that is configured to operate in accordance with the present disclosure is contemplated. For simplicity the terms "locator", "remote locator", and "base station" will be referred to hereinafter as simply a remote locator or "RL."

The transponder can also be referred to herein as a micro-transponder or a tag. The term "micro" is intended to imply that the transponder can be a small form factor device. In some examples, the transponder device can correspond to a portion of another system such as an electronic system in a vehicle or some other electronic device such as a radio handset. In some other examples, the transponder device can be embedded in an object as a standalone device. Example objects where the transponder might be embedded include, but are not limited to, a fabric such as an article of clothing, a dog-tag, a wrist-band or a collar that may be worn or affixed to a subject. In still other examples, the transponder device may be implanted into a subject. These examples are not intended to be limiting and any appropriate device that is configured to operate in accordance with the present disclosure is contemplated. For simplicity the terms "transponder", "micro-transponder", and "tag" will be referred to hereinafter as simply a micro-transponder or "MT."

Example Operating Environment

FIG. 1A illustrates an example operating environment (100) of the present disclosure. As illustrated, a RL (110) may be located in a distant location such as in a satellite that is orbiting above a surface (121) of a planet (120). A number of MTs may be positioned about surface 121 of planet 120. For example, MTs 131, 132 and 133 may be positioned at various locations about surface 121 of planet 120.

As will be described further below, the RL and the MT each include a receiver and a transmitter. The RL is adapted to transmit an interrogation signal as a coded transmission sequence that is coded for receipt by one or more of the MTs. The receiver in each MT is configured to capture samples from the signal spectrum and determine if a valid interrogation transmission sequence is identified in the captured samples using an internally stored version of the code (e.g., MT ID Code). When a valid interrogation transmission sequence is identified, the MT can decode information from the captured samples, synthesize a frequency, phase, and cadence for transmitting, a reply transmission to the RL, and initiate a reply transmission sequence for receipt by the RL. The RL can further be configured to capture samples from the signal spectrum to determine if a valid reply transmission sequence is identified in the captured samples. When a valid reply transmission sequence is identified, the RL can decode information from the captured samples, calculate round-trip time of flight between transmission of the interrogation signal and receipt of the reply signal, determine a precise velocity difference between the RL and the MT and from the preceding, determine a precise location of the MT.

Each of the MTs may have a unique identifier (e.g., MT ID Code) that can be used for encoding communications (140) between RL 110 and the corresponding MT. In some examples, each individual MT has a unique code (e.g., MT 131 and MT 133). In other examples, groups of MTs may share a common code (e.g., MTs 132) so that messages may be easily communicated to multiple MTs that share a common broadcast code.

The presently described asymmetric transmission system can be configured such that the MT receives a relatively high power transmission of a structured signal from the RL, while the reply or acknowledgement transmission from the MT to the RL is a very low power transmission. An example MT is configured to operate in a very low power "inactive" mode or "sleep mode", where the MT "activates" or "wake-ups" for brief intervals to listen for the transmission from the RL. When active, the MT can correlate each piece of its received structured signals to determine if these signals are coded with an identification code (MT ID Code) that is specifically associated with the MT. The MT also determines the precise frequency, timing, phase, and cadence for which a reply transmission can be transmitted back to the RL from the received structured signals. The reply transmission that is transmitted from the MT to the RL is a very low power transmission of adequately short duration (a short structured signal) such that significant battery life is conserved and adequate signal-to-noise ratios can be achieved at the RL. Although the reply transmission is a very low power transmission, the RL can be arranged to utilize an integration and circular correlation technique to increase the signal-to-noise level of the captured reply transmission.

The frequency of the reply transmission from the MT to the RL can differ from the original frequency from the RL's transmission due to the Doppler Effect (ignoring other noise and minor error sources). The Doppler Shift between the original transmission and the reply transmission is due to relative movement (e.g., velocity, acceleration, etc.) of the devices. For example, RL 110 may be located at a great distance (e.g., altitude or distance X) above surface 121 of planet 120. The RL can be positioned in an air craft, a satellite, a space station, or perhaps on a celestial body in space. The range of distances for orbiting satellites is dependent upon the mass of the planet and the velocity of the satellite. In some examples, the satellite may be in a low earth orbit (LEO) with a distance of about 400 kilometers (km), while in other examples the satellite may be in a higher orbit with a distance of about 10,000 km or 20,000 km. Based on the orbit and velocity of the satellite, the satellite will either be in locked in a stationary position relative to a given ground position (i.e., at a fixed set of angles from earth to satellite), or moving (either preceding or receding) relative to the given ground position.

For a typical Global Positioning System (GPS) navigation satellite, the satellite has an altitude of about 20,000 kilometers above the surface of earth. GPS satellites essentially broadcast their known position and time of transmission information, where each GPS satellite has an atomic clock with an accuracy of about 1 nanosecond (1 billionth of a second). To determine the distance between a GPS receiver (e.g., on the surface of the earth) and a GPS satellite, the GPS receiver captures signal transmissions from a GPS satellite and compares the time of transmission of the signal to the time of receipt by the GPS receiver. The difference in time of receipt from time of transmission corresponds to a distance between the GPS satellite and the GPS receiver. However, a single distance calculation corresponds to a line of possible positions on the surface of Earth at an equal distance from the satellite. By capturing transmissions from additional GPS satellites, additional distance determinations can be made for additional lines of position along the surface, and the intersection between all lines of possible positions should indicate an accurate position fix. For the distance measurements to be accurate, the timing in the GPS receiver must also have a high accuracy clock, which is typically not the case in low power/low cost devices. However, the clock accuracy can be removed mathematically with use of captures from four GPS satellites.

Satellites are typically moving at a considerable rate relative to the ground based receivers, which can lead to a significantly large shift in frequency due to the Doppler Effect. For example, a satellite at an altitude of 20,000 km orbits the earth in about 12 hours with a speed of about 14,000 km/hr. When the satellite transmits a fixed frequency signal, the received signal at the ground based receiver exhibits a significant shift in frequency due to the velocity of the satellite relative to the ground based receiver.

Doppler Shifts in Communications Over Large Distances

There are a number of possible advantages associated with the potential use of coherent, active, two-way long range MTs linked to RLs in low earth orbit (LEO) such as with altitude of about 400 km (about 248 miles). One possible advantage is that the communication coverage area for LEO satellites such as an Iridium-like constellation may allow constant global access to communication signals. The high LEO velocity with respect to the Earth's surface produces large Doppler shifts, which, if processed correctly, can be used to produce precise direction cosines for accurate single epoch geo-location.

There are some challenges to be overcome that are recognized by the present disclosure.

First, there is a very high path loss for communication in LEO (e.g., 158 db path loss with isotropic antennas at a distance of 2,200 km, using 915 MHz signaling.

Second, there are very large Doppler shifts, which are a function of relative velocity (e.g., Doppler shifts spans about ±21.5 KHz for 915 MHz signals at a relative velocity of 7 Km/sec.

A third challenge to be addressed is that two way active fully coherent synchronous MTs synthesized replies will have double the Doppler shift as received in orbit. This means the on-orbit Doppler span may be about ±43 KHz.

A fourth challenge to be addressed is that the MTs may not be able to emit as much power as the satellite borne RLs, as they likely have very small batteries and are themselves very small, which presents other difficulties with high power transmissions. Consequently, to achieve a balanced system, the MT to RL capture periods may need to be longer than the RL to MT capture periods. This combined with a total Doppler span of about 86 KHz may require the satellite based RL to evaluate a large number of Doppler bins. If, for instance, the satellite transmitter radiated 10 watts and all antennas were isotropic equivalent, then the MT's captured signals would be −148 dbw or −11.8 dbm. This sensitivity can be achieved with the described system receiving a single packet, given a receiver noise figure of 4 db and very little local noise. It may be desirable in many applications to have appreciable path loss margin (fade or building or other attenuation). If the receiver integrated 64 packets for instance, then a margin of 18 db may be achieved. Pushing to the practical limits of conventional technology for small long lived MTs, 128 packets could be integrated to yield a margin of about 21 db. This means a total loss budget of 179 db could be achieved. If the MT transmitter had a power of 1 watt, then the satellite, to receive as much energy, may need to capture and coherently process about 1280 packets. This presents considerable computational difficulties since the number of Doppler bins is large. For example, at 87 KHz×1280 Packets×157 usec, about 17,000 Doppler bins may be needed, and the computation may require about 4 billion computational operations (if done in about 100 milliseconds, a 40 gigaflop device would be required, which is a serious challenge in conventional technology in limited power budgets). If it is desired to implement a clandestine system with un-patterned MT transmissions, then the processing difficulties increase to an impracticable level of something like a few trillion operations, (if done in about 100 milliseconds, the computational operations are on the order of tens of teraflops, which is in the realm of supercomputing today (2010)).

A fifth challenge to be overcome is that the large Doppler shift is accompanied with "chirp" or frequency rate of change. Frequency measurements by the MT may be complicated since the chirp has a maximum value with a satellite at zenith of about 216 Hz/second.

A sixth challenge is that since the velocities measured are quite vast compared to airborne RL processing, it is important to account for all Doppler effects to avoid inaccuracies. In one example, the RL/interrogator might be on an aircraft traveling at a rate of about 100 meters/sec, which is relatively fast for a propeller driven craft. If the processing delay between the end of receive and the beginning of transmit is on the order of about 10 milliseconds, then the time delay error might be on the order of the one-way Doppler of about 330 parts per billion (ppb) times that delay. For example, a 10 millisecond delay times 330 ppb is 3300 picoseconds, which corresponds to one meter that when divided by 2 yields a distance error of one half meter, which is a small factor and easily dealt with in an airborne RL. Once an airborne RL acquires Doppler information, the small delay errors can be accounted for. However, on a LEO satellite the RL may be closing on the MT at a rate of about 7.4 km/sec, which corresponds to a one way Doppler of about 24 ppm. If the MT is using the acquired Doppler shifted RL clock, then the MT will count time fast, effectively shortening the actual 10 msec time by about 24 ppm, which is 240 nanoseconds, which may yield a distance calculation error due to inaccurate delay of about 35 meters. The procedures employed by the MT and RL in the present disclosure differ from applicant's prior work in that although the MTs may still acquire all timing from the received Doppler shifted RL signals, the MTs reply transmissions will need to be compensated for the large velocities.

Given all of the above noted challenges, it is desirable to have a technique for reducing the satellite-borne computational burden. The MTs are adapted to synthesize their return signals to match the received signals, where the MTs are configured to measure phase as a correlation output (a complex vectors arc tangent). The rate of change of phase corresponds to frequency, and the rate of change of rate of change corresponds to chirp. Thus, ignoring higher order terms, phase(X)=phase(X−1)+(T×$\Delta$f)+(T×T×chirp/2), where T corresponds to the inter-sample interval and $\Delta$F corresponds to the frequency offset.

To solve for $\Delta$F and chirp, a quadratic from 3 points on a curve are solved. For a single Doppler bin, a 64 packet capture could correspond to about 10 milliseconds (ms) with a range of about 100 Hz. As an example, for an offset within a bin of about 30 Hz, two captures about 20 ms apart can be used to measure the approximate frequency offset by assuming chirp to be zero. Chirp across 20 ms could alter phase by a maximum of about (216 Hz/s)×(0.02 s×0.02 s)/2, which is (216 Hz/s)×(0.0002 $s^2$), which gives 216 Hz/s×0.0002 $s^2$ which is units of 0.0002×216=0.0432 Hz-s, which corresponds to about 0.0432 turns or about ±15 degrees. A rotational measurement over 0.02 s to an accuracy of about 15 degrees yields an uncertainty of about 1/24 turn per 1/50 second, or about ±2 Hz. A quadratic of 3 samples can be solved for better results, where the samples are uniformly spaced apart in 20 ms intervals. In the absence of chirp with 20 ms interval spacing, P2−P0 should be twice P1−P0. With chirp, P2−P0=2×(P1−P0)+(2×chirp_term), since the chirp_term is proportional to the time squared. We need to be mindful of aliasing here, but this is a detail. This allows the MT to assign a frequency to the incoming signal at any moment.

The MT can be configured to synthesize an output frequency that could match the incoming frequency at any given time, predicting the frequency at the middle of the MTs initial return as though the RL continued to transmit. If the MT transmission is quite lengthy, say 160 milliseconds, the chirp term could alter frequency by up to 40 Hz or so, which is a large shift. The MT will not ordinarily return doubled chirp unless it needs to do so.

A first remaining question is: can the MT be adapted to transmit a reverse (or compensated) Doppler shifted frequency to reduce the huge processing burden in the satellite borne RL while maintaining Doppler measurement capability? In principal, if MTs had perfectly accurate oscillators, they could measure the incoming Doppler shifted frequency, report it to the RL, and simply reply with a fixed delay. This likely cannot be done, since tiny long lived MTs will not likely include atomic clocks, nor will they likely incorporate always ready GPS frequency measurements. In addition, the transmission of so much data (precision frequency information) over a low data rate link would waste a lot of energy.

A next question is: can the MTs approximately measure incoming Doppler and subtract off twice a coarsely quantized estimate of the Doppler, report the quantized estimate to the RL, and transmit the reply using the Doppler compensated frequency? In some examples, a MT can include an oscillator stable to within 1 part per million (1-ppm) over time and temperature. The RLs frequency can be very accurate, better than ±100 parts per billion.

Suppose that a MT oscillator is at the edge of its tolerance band and reads an incoming signal which is actually at +11 ppm Doppler, as being at either +12 ppm or +10 ppm. Next, suppose the MT retransmits at −24 ppm or −20 ppm. In one case, the RL will see a signal +11 ppm−24 ppm+11 ppm=−2 ppm, and in the other case, it will see +11 ppm−20 ppm+11 ppm=±2 ppm. Thus, in principal, the Doppler range could be reduced to about ±2 ppm, and the rest of the Doppler encoded. This would compress the search range from 92 ppm to 4 ppm. This is a satellite computation savings of 23 times, as an example.

In some example implementations, the RL can be adapted to recover initial correlation data and a frequency estimate which has an unknown, possibly large frequency shift. The RL captures another data bearing transmission which consumes very little energy, since not only is most Doppler stripped off or canceled at the MT, but the RL knows the residual Doppler very well. The RLs Doppler bin search is governed by the chirp. If the transmissions are separated by an interval of 0.2 s, then the maximum search range is about +0.2×216 Hz, which is about ±43 Hz, a tiny amount compared to ±43 KHz. The RL can be configured to recover data by any reasonable means such as extraction of data coded in rotational modulation, or perhaps data coded in packet delay modulation. Once the data value is recovered, e.g., about 7 bits of data, a signed number for Doppler offset can be applied. The encoding could be as simple as 7-bit twos complement frequency adjustment in 1 ppm chunks. As this offset is applied very precisely by the MT, then the RL can recover the total double Doppler shift, and therefore the relative velocity as if the MT had processed the Doppler conventionally, and emitted a signal synchronous with the received RL signal. Note that this adjustment would apply to chip rates as well as carrier frequencies.

The described technique applies primarily to systems using very high velocity, since such systems have a Doppler shift greater than the reasonable tolerance of a good temperature compensated crystal oscillator (TCXO). When the Doppler range is very large, we can approximately measure it with the MTs oscillator as a time base. This is likely meaningless for ground or air based systems. In those systems, doubled Doppler shift isn't much of a problem, even at say, Mach 1.

In sum, the present disclosure describes a process for coarsely measuring incoming Doppler with a MT, coarsely pre-compensating for return Doppler with the MT, transmitting the signal with residual Doppler from the MT to the RL, with data communicating the coarse part of the Doppler from the MT to the RL. This described technique may greatly reduce the difficulty associated with spacecraft processing, with a small MT energy cost, since the MT would, even without this innovation send back a structured reply consisting of more than one cyclically summed packet set. This disclosed process is further suitable for use in clandestine communication from MTs to RLs in space, without extreme processing requirements. Note that in many cases the processing gain may not need to be at maximum.

Example System

Figure 1B:
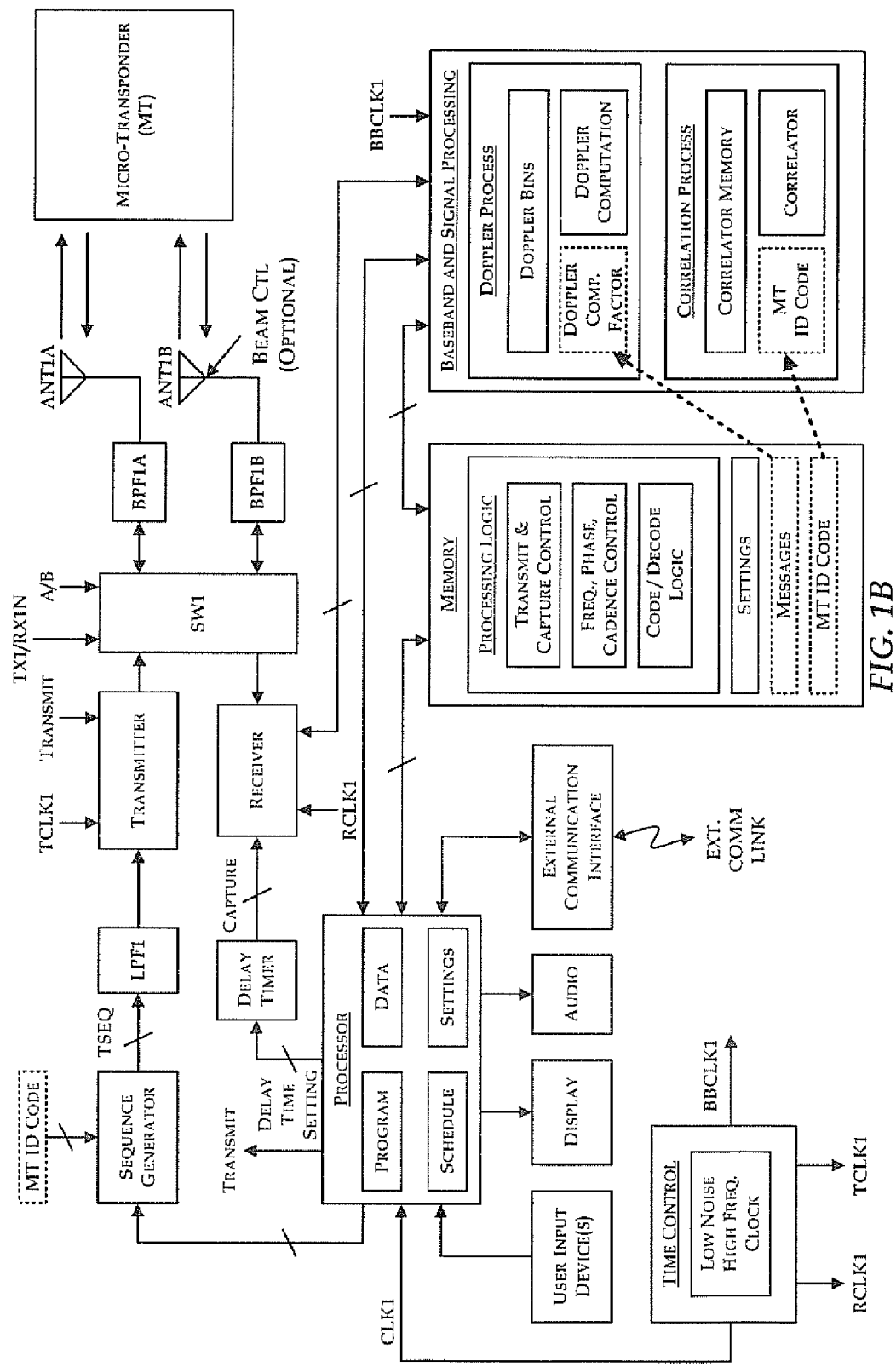
FIGS. 1B and 1C illustrate an example communication system that includes a remote locator (RL) and a micro-transponder (MT)
Figure 1C:
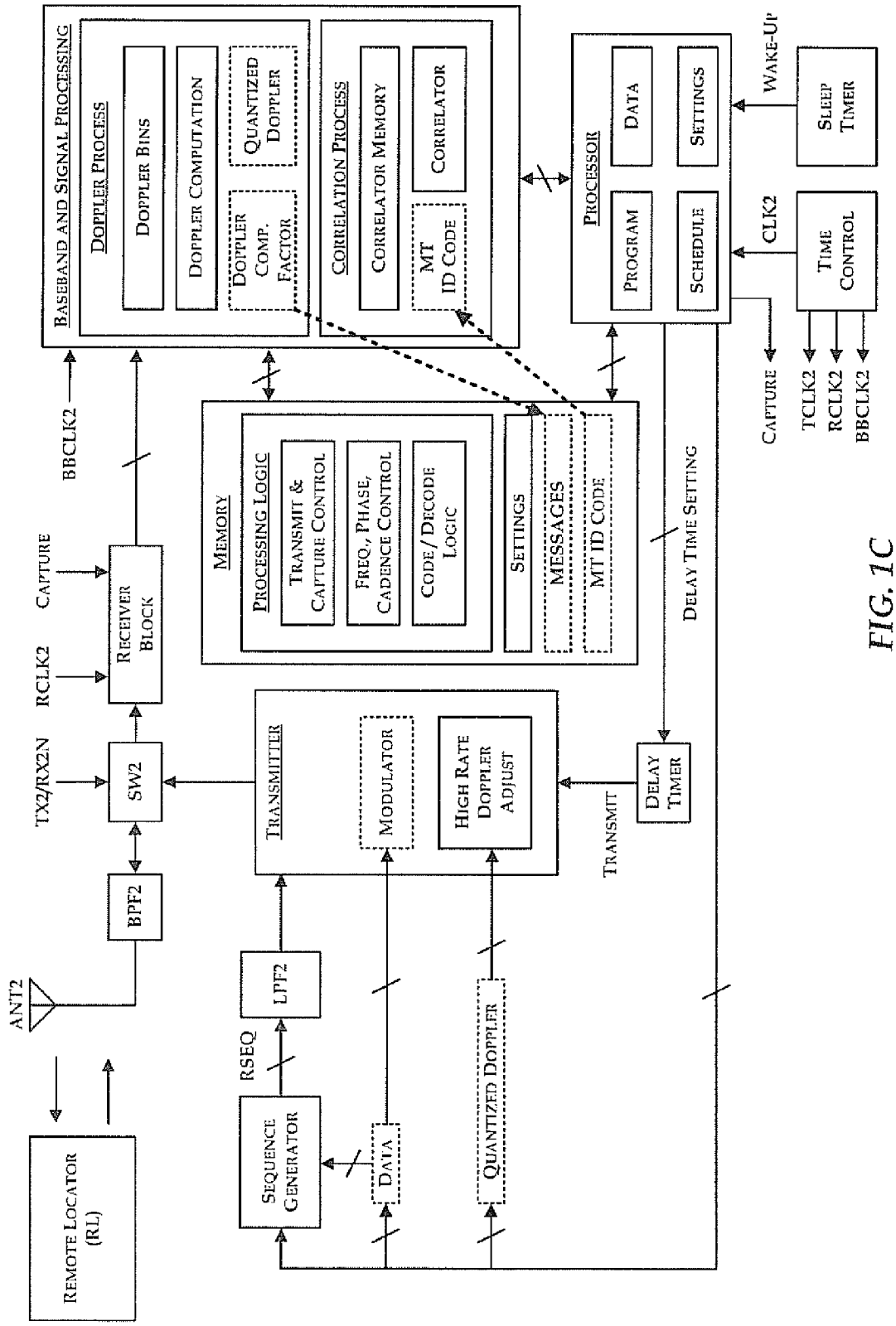

FIGS. 1B and 1C together illustrate an example communication system that includes a RL and a MT arranged in accordance with at least some aspects of the present disclosure.

The RL is generally configured to transmit a sequence of symbols over a first communication channel. The sequence of symbols transmitted by the RL can collectively be referred to as an interrogation signal. The interrogation signal can be effectively encoded by the RL for receipt by either a specific MT or a group of MTs. In some examples, the RL is also configured to capture samples of the signal spectrum associate with a second communication channel to effectively listen for a reply transmission from a MT. Additional actions, operations or functions can be executed by the RL once a valid reply transmission is identified from the captured samples.

The MT is generally configured to capture samples from the signal spectrum associated with the first communication channel, and identify if the captured samples correspond to a valid interrogation signal that was encoded for receipt by the specific MT. Additional actions, operations or functions can be executed by the MT once a valid interrogation signal is identified from the captured samples. In some examples, messages from the RL to the MT can be decoded from the captured samples of the interrogations signal, where the MT may be dynamically configured in response to the decoded messages. In other examples, a reply transmission sequence can be generated by the MT, and a corresponding reply transmission signal can be transmitted over a second communication channel to the RL. The reply transmission signal can be synthesized by the MT using the frequency, phase, timing and cadence acquired from the RLs interrogation signal. In some examples, the MT can be adapted to encode messages for the RL in the reply transmission signal.

The RL is configured to determine a precise location of the MT based on the roundtrip time-of-flight and the roundtrip Doppler shift for the communications exchanged between the RL and the MT. For the various examples described herein, the RL has additional features that are adapted to reduce the overall computational burdens required to determine the location of the MT.

Example Remote Locator (RL)

FIG. 1B illustrates an example RL that can be arranged to communicate with an example MT in accordance with various aspects of the present disclosure. An example RL device may include a transmitter block, a receiver block, a first set of antennas (ANT1A, ANT1B), a first transmit/receive switch (SW1), a first processor, a first memory block, a first baseband and signal processing block, a first time control block, a first sequence generator, a first delay timer, a first set of band pass filters (BPF1A, BPF1B), and/or a first low pass filter (LPF1).

The first set of antennas (ANT1A, ANT1B) can be coupled to the first transmit/receive switch (SW1), such as through a respective one of the first set of band pass filters (BPF1A, BPF1B). The first transmit/receive switch (SW1) is also coupled to the first transmitter block and the first receiver block. On one side of the first transmit/receive switch (SW1), signals can be selectively routed to either antenna of the first set of antennas (ANT1A, ANT1B) in response to an antenna select control signal (e.g., A/B). On the other side of the first transmit/receive switch (SW1) signals can be selectively routed to either the first receive block or the first transmitter block in response to a first transmit/receive control signal (TX1/RX1N).

The first processor can be coupled to the first sequence generator, the first delay timer, the first memory block, the first baseband and signal processing block and/or the first time control block. The first time control block can also coupled to the first transmitter block, the first receiver block, and/or the first baseband and signal processing block. Time control can be provided to the first transmitter block, the first receiver block, the first baseband and signal processing block, and the first processor in the form of various control signals from the first time control block (CLK1, RCLK1, TCLK1 and BBCLK1). For example, the first processor can be operated from a first processor clock (CLK1), the first transmitter block can be operated with a first synthesized transmitter clock (TCLK1), the first receiver can be operated with a first synthesized receiver clock (RCLK1), and the baseband and signal processing block can be operated with a first base-band clock (BBCLK1).

The first transmitter block can be further coupled to the first sequence generator such as through an optional low pass filter (LPF1). A first transmission sequence (TSEQ) can be coupled to an input of the first transmitter block from the first sequence generator. The first transmitter block can be configured to carrier modulate the first transmission sequence (TSEQ) for transmission via the first transmit-receive switch (SW1) and a selected one of the antennas (e.g., via antenna control A/B) in response to a transmit control signal (e.g., TRANSMIT) when the first transmit/receive control signal (TX1/RX1N) is asserted for transmission. The carrier modulated signal can be of any reasonable form (e.g., multi-phase shift keying, binary phase shift keying, quadrature phase shift keying, differential phase shift keying, continuous phase modulation, multiple amplitude and phase shift keying, etc.) where the coded signals can be carrier modulated with a carrier frequency, a spread spectrum carrier, and/or a frequency hopping method.

A first band-limiting filter (e.g., BPF1) can optionally be provided between the selected one of the antennas and the first transmit-receive switch (SW1) such that out-of-band signals may be ignored. The first band-limiting filter (BPF1) can be any filter that provides reasonable band-limiting functions such as: a passive band-pass filter, an active band-pass filter, a surface acoustic wave (SAW) filter, a bulk acoustic wave (BAW) filter, a comb filter, a strip-line filter, to name a few.

The first receiver block can be further coupled to the first delay timer and the first baseband and signal processing block. The first receiver block can be configured to selectively capture samples of the signal spectrum via the selected one of the antennas (e.g., via antenna control A/B) in response to a capture control signal (e.g., CAPTURE) when the first transmit/receive control signal (TX1/RX1N) is asserted for reception. The captured samples can be selectively coupled from the first receive block to the first baseband and signal processing block for further processing. The captured samples may consist of a series of coded signals generated by the MT with a unique identifier (e.g., the MT ID Code), where the signals may be carrier modulated similarly as described with the first transmitter block (e.g., multi-phase shift keying, binary phase shift keying, quadrature phase shift keying, differential phase shift keying, continuous phase modulation, multiple amplitude and phase shift keying, etc.). The second receiver block can be configured to demodulate the carrier frequency and provide I and Q information, which can subsequently be captured by a capture buffer (e.g., a digital capture buffer such as memory, or an analog capture buffer). The captured signals can thus be represented as complex data or complex samples, which can be processed by the baseband and signal processing blocks for correlation and other functions.

The captured samples from the first receiver block can be processed by the first baseband and signal processing block using any variety of signal-processing functions such as digital signal processing (DSP), analog signal processing, Fast Fourier Transform (FFT), correlation, inverse FF1 (IFFT) to name a few. Alternatively, the baseband processor can be arranged to provide captured signals to the first processor, which can be arranged to handle various signal-processing functions.

In some examples (e.g., when a secure communications mode is active), the capture time for the first receiver block may be determined from a secretly known delay time (e.g., delay time setting), which may be determined by the first processor using one or more of the processing logic, settings, shared keys, and/or delay times that may be stored in the memory of the RL. In some examples, the capture signal (e.g., CAPTURE) may be asserted for a capture interval that begins after a predetermined time period expires that may be established by the first delay timer using various predetermined delay time settings.

Various control signals that are utilized by other blocks of the RL can be generated by the first processor under operation of a program or some other processing logic. When a transmission sequence is initiated by the first processor (e.g., according to a schedule, or in response to a user initiated action), a first transmission sequence (e.g., TSEQ) can be generated by a first sequence generator using a unique identifier (MT ID Code), which can then be coupled to the first transmitter block. Based on the unique identifier (MT ID Code), the first transmission sequence (TSEQ) can be encoded for receipt by a specific MT or a specific group of MTs. The first processor can also be adapted to coordinate the operation of the first baseband and signal processing block, the first memory block, and also can be configured to process inputs and outputs such as from user input devices, display devices, audio devices, and any other external communication interfaces (e.g., external communication links).

The first processor can be any appropriate processing means including but not limited to at least one: micro-processor, micro-controller, CISC processor, RISC processor, application specific integrated circuit (ASIC), to name a few. The processor in the RL can be arranged to: receive and evaluate inputs, control outputs, log data, retrieve logged data, and execute programs. The processor of the RL can thus arranged to communicate with any number of circuit components such as: the first time control block, the first delay timer, the first sequence generator, a storage circuit (not shown), the first baseband and signal processing block, a user input device, a display device, an audio device, an external communication interface, and/or a memory circuit such as the first memory block. The first memory block can include random access memory (RAM), read-only memory (ROM), as well as non-volatile memory (NVM) such as Flash memory, battery backed up RAM, EEPROM, as well as other NVM type technologies.

The first processor can be arranged to execute programs, access data, apply schedules and/or apply processing logic that is responsive to messages received from the MT, as well as its own internal mechanisms, for activating and deactivating a variety of operating modes as will be described. The programs, schedules, processing logic and any related settings for the RL can be provided in a read-only memory (ROM) that can be loaded into a conventional memory for use by the first processor, or by some equivalent mechanism such as a non-volatile memory (NVM), a flash memory device, and hard-coded instructions in a micro-controller, to name a few. In another example, the first processor and first memory block can be replaced with a programmable logic device (PLD), a specially designed circuit such as an application specific integrated circuit (ASIC), as well as others devices that are arranged to provide similar functionality. The processing logic can include procedures for adapting the RL for transmit and capture modes, changing between secure and unsecure communication modes, adapting the frequency, phase and cadence of synthesized carriers, and/or logic for coding/decoding messages.

Example inputs can be from any number of sources such as: an interrupt signal, a keyboard device, a keypad device, one or more buttons or keys, a touch-screen (passive or active), a touch-panel, a joystick device, a joy-pad device, a mouse device, a pointing device, a touch-pad device, a pressure sensitive input device, or another processor and an input generated by a software program. In some examples, sound can be used as an input to the RL via audio input processor such as an analog-to-digital converter (ADC) circuit or a coder-decoder (CODEC) circuit that includes analog-to-digital conversion means. A microphone can be built into the RL or externally coupled to the RL through a microphone port for sound input purposes, where signals received by the microphone into a digital signal that can be interpreted as an input. The sound-based input can be stored for further use (e.g., a sound file for playback or recognition purposes) or interpreted as a voice input that can be utilized by the RL. In some implementations, a voice-to-text interpreter can be incorporated into a hardware solution that is arranged in communication with the processor. In some other examples, voice recognition under software control implemented by the audio input processor to operate as a voice input means that generates an example input.

Audio output circuits can be used as an indication means for reporting audible information to a user of the RL device, as well as to provide navigation and location information. The audio output circuit can include an audio output device and an audio output processor. The audio output processor can be arranged to cooperate with the audio output device to provide an audible notification to the user. The functions of the audio output device and the audio output processor can be combined in some implementations. The audio output device can be an audio driver circuit for a headphone type device or a speaker type device. In some examples, a speaker or a piezo device is included in the RL to provide sound output. In another example, an audio output port such as a headphone jack can be provided in the RL for a user to connect a headphone type device, or perhaps an external speaker connection.

The audio output processor can be a single tone generator circuit, a polyphonic tone generator circuit, a polyphonic synthesizer circuit, a voice synthesizer circuit, a MIDI playback circuit, or a sound playback circuit. In some examples, the audio output processor includes digital-to-analog conversion means such as from a digital-to-analog converter (DAC) circuit or from a CODEC circuit. The voice synthesizer circuit can include a text to speech interpreter. The voice synthesizer can also be arranged to provide various regional voice affectations and language accents, such as male and female voices, robotic voices, English accents, French accents, Spanish accents, etc. In some examples, the audio output processor is arrange to provide music playback that can be in any desired format such as a lossy compressed sound file, a non-lossy compressed sound file, or an uncompressed sound file. In other examples, the audio output processor device is arranged to provide playback of previously recorded sounds or user recorded sounds. The recorded sounds can be voice messages such as can be provided in character voices (e.g., cartoon characters), recordings of celebrities, or as impressions of recognizable voices. In some examples, the audio output processor can be combined in function with the audio input processor previously described.

Display circuits can also be used as an indication means for reporting visual information to a user of the RL device, as well as to provide navigation and location information. Example display circuits can provide any appropriate video output such as, for example: an LED type display, an LCD type display, an active display, a passive display, a black and white display, a monochromatic display, and/or a color display. Other example display circuits can be discrete arrangements of LEDs, seven segment displays, as well as other light emitting devices that can be used for reporting visual information. In some examples, the user interface can be integrated with the video output device such as, for example, a touch screen that is integrated with an LCD display. In other examples, the user input interface can be separate from the video output device.

The RL can be operated to send (i.e., transmit) a transmission sequence (TSEQ) that consists of a series of coded signals. The coded signals can be keyed by a unique identifier (e.g., an MT ID Code) that is associated with a specific MT, or in some examples with a group of MTs when the message is coded as a broadcast message. The first sequence generator can be arranged to evaluate the unique identifier and create a transmit sequence (e.g., TSEQ). After the coded sequence is generated for the unique identifier, additional information can be encoded into the transmit sequence. In one example, the additional information can be command/control instructions for the MT. The output of the first sequence generator (e.g., TSEQ) can be filtered such as by the first low pass filter (LPF1) prior to coupling the signal to the first transmitter block.

The described RL can be configured to perform distance measurements by round trip time measurement. For example, the round trip time can be determined by the difference in time between the transmission of a signal from the RL to the MT, and the subsequent reply transmission of an acknowledgement signal from the MT back to the RL, offset by any other delays. In some example implementations, the delay time can be further offset by an intentional delay (e.g., secret delay time that is mutually known by the MT and the RL) that can be added for security. In these examples, the intentional delay can be removed (e.g., subtracted) from the distance measurement calculation.

In some implementations, the above described remote locator (RL) can be arranged to provide a relatively high power transmission signal (e.g., 1 Watt).

The first baseband and signal processing block in the RL can include processing for a correlation process. The correlation process can employ a correlator memory and a correlator. The correlator can be preloaded with the appropriate values of the MT ID Code or a corresponding sample pattern prior to a capture interval of the first receiver block in the RL. The next capture interval of the first receiver block can be scheduled by the processor at a predetermined time, which may be determined (e.g., by the first processor) in part by a delay time (e.g., via secret shared keys between the RL and MT). The correlator can then compare the captured samples from the first receiver block with the sample pattern that was computed or retrieved from memory.

The first baseband and signal processing block in the RL can also include processing for a Doppler process. The Doppler process can employ Doppler Bins and can be adapted to offset the Doppler computations using a Doppler compensation factor retrieved from the message decoded from the MT. This process will be further described in connection with FIG. 3B.

In some examples, the Doppler process and the correlation process in the RL can be combined into a single process, where the RL correlator may further include Doppler processing capable of processing multiple spins since the duration of the capture interval of the receiver block will be considerably long and the round-trip or doubled Doppler shift may be unknown. For example, the correlator can be configured to attempt to correlate a previously stored 100K sample pattern (i.e., a reference sample pattern of 100K samples) over multiple spins. This pattern may be nominally 5 milliseconds long with a sample rate of about 20 MHz. A Doppler shift of ±200 Hz or a multiple thereof will result in a null from the correlator. Degradation in accuracy may occur for frequency offsets that exceed about 100 Hz, which corresponds to a round trip shift of about 110 ppb. The Doppler processing may attempt to spin or twist either the captured pattern or the reference sample pattern by an integer number of spins (e.g., 0, ±1, ±2, ±3, etc.) so that the correlation of the captured pattern will be determined to match along with the precise number of turns.

Example Micro-Transponder (MT)

FIG. 1C illustrates an example MT that is arranged to communicate with a RL in accordance with one or more aspects of the present disclosure. An example MT device may include a second transmitter block, a second receiver block, a second antenna (ANT2), a second transmit/receive switch (SW2), a second processor, a second memory block, a second baseband and signal processing block, a second time control block, a sleep timer, a second sequence generator, a second delay timer, a second band pass filter (BPF2), and/or a second low pass filter (LPF2).

The second antenna (ANT2) can be coupled to the second transmit/receive switch (SW2), such as through the second band pass filter (BPF2). The second transmit/receive switch (SW2) is also coupled to the second transmitter block and the second receiver block. On one side of the second transmit/receive switch (SW2), signals can be routed to the second antenna (ANT2). On the other side of the second transmit/receive switch (SW2) signals can be selectively routed to either the second receive block or the second transmitter block in response to a second transmit/receive control signal (TX2/RX2N).

The second processor can be coupled to the second sequence generator, the second delay timer, the second memory block, the second baseband and signal processing block, the sleep timer, and/or the second time control block. The second time control block can also coupled to the second transmitter block, the second receiver block, and/or the second baseband and signal processing block. Time control can be provided to the second transmitter block, the second receiver block, the second baseband and signal processing block, and the second processor in the form of various control signals from the second time control block (CLK2, RCLK2, TCLK2 and BBCLK2). For example, the second processor can be operated from a second processor clock (CLK2), the second transmitter block can be operated with a second synthesized transmitter clock (TCLK2), the second receiver can be operated with a second synthesized receiver clock (RCLK2), and the baseband and signal processing block can be operated with a second base-band clock (BBCLK2). A wake-up signal (e.g., WAKE-UP) can be generated by the sleep timer to initiate various functions/operations or actions associated with the second processor.

Since an example MT may be configured to operate with limited energy, the MT can be adapted to operate in a low power or sleep mode where high frequency clocks are disabled. The energy consumed in the sleep mode is sufficient to operate a sleep timer that operates from low frequency clock signals. According to a pre-determined time interval, the MT can be activated (e.g., wakeup is asserted by the sleep timer) and the MT can be configured enable high frequency clock signals and operate the second receiver block to capture samples from the signal spectrum and evaluate the captured signals to identify an interrogations signal. When no identifiable interrogation signal is found in the captured samples, the MT can return to the sleep mode, where the high frequency clocks are again disabled.

The second transmitter block can be further coupled to the second sequence generator such as through an optional low pass filter (LPF2). A second transmission sequence (RSEQ) can be coupled to an input of the second transmitter block from the second sequence generator. The second transmitter block can be configured to carrier modulate the second transmission sequence (RSEQ) for transmission via the second antenna (ANT2) in response to a transmit control signal (e.g., TRANSMIT) when the second transmit/receive control signal (TX2/RX2N) is asserted for transmission. The carrier modulated signal can be of any reasonable form (e.g., multi-phase shift keying, binary phase shift keying, quadrature phase shift keying, differential phase shift keying, continuous phase modulation, multiple amplitude and phase shift keying, etc.) where the coded signals can be carrier modulated with a carrier frequency, a spread spectrum carrier, and/or a frequency hopping method.

A second band-limiting filter (e.g., BPF2) can optionally be provided between the second antenna (ANT2) and the second transmit-receive switch (SW2) such that out-of-band signals may be ignored. The second band-limiting filter (BPF2) can be any filter that provides reasonable band-limiting functions such as: a passive band-pass filter, an active band-pass filter, a surface acoustic wave (SAW) filter, a bulk acoustic wave (BAW) filter, a comb filter, a strip-line filter, to name a few.

The second receiver block can be further coupled to the second delay timer and the second baseband and signal processing block. The second receiver block can be selectively configured to capture samples of the signal spectrum via the second antenna (ANT2) in response to a capture control signal (e.g., CAPTURE) when the second transmit/receive control signal (TX2/RX2N) is asserted for reception. The captured samples can be selectively coupled from the second receive block to the second baseband and signal processing block for further processing. The captured samples may consist of a series of coded signals generated by the RL with a unique identifier (e.g., the MT ID Code), where the signals may be carrier modulated similarly as described with the second transmitter block (e.g., multi-phase shift keying, binary phase shift keying, quadrature phase shift keying, differential phase shift keying, continuous phase modulation, multiple amplitude and phase shift keying, etc.). The second receiver block can be configured to demodulate the carrier frequency and provide I and Q information, which can subsequently be captured by a capture buffer (e.g., a digital capture buffer such as memory, or an analog capture buffer). The captured signals can thus be represented as complex data or complex samples, which can be processed by the baseband and signal processing blocks for correlation and other functions.

The captured samples from the second receiver block can be processed by the second baseband and signal processing block using any variety of signal-processing functions such as digital signal processing (DSP), analog signal processing, Fast Fourier Transform (FFT), correlation, inverse FFT (IFFT) to name a few. Alternatively, the baseband processor can be arranged to provide captured signals to the first processor, which can be arranged to handle various signal-processing functions.

In some examples (e.g., when a secure communications mode is active), the capture time for the second receiver block may be determined from a secretly known delay time (e.g., delay time setting), which may be determined by the second processor using one or more of the processing logic, settings, shared keys, and/or delay times that may be stored in the memory of the RL. In some examples, the capture signal (e.g., CAPTURE) may be asserted for a capture interval that begins after a predetermined time period expires that may be established by the second delay timer using various predetermined delay time settings.

Various control signals that are utilized by other blocks of the MT can be generated by the second processor under operation of a program or some other processing logic. When a transmission sequence is initiated by the second processor (e.g., according to a schedule, after a wake-up cycle is initiated by the sleep timer, in response to some other program control, etc.), a second transmission sequence (e.g., RSEQ) can be generated by a second sequence generator using a unique identifier (MT ID Code), which can then be coupled to the second transmitter block. Based on the unique identifier (MT ID Code), the second transmission sequence (RSEQ) can be encoded to indicate that the sequence is from a specific MT or from a specific group of MTs. The second transmission sequence (RSEQ) may also be encoded with additional data or messages that may need to be communicated to a RL. The second processor can also be adapted to coordinate the operation of the second baseband and signal processing block, the second memory block, and also can be configured to process inputs and outputs such as from user input devices, display devices, audio devices, and any other external communication interfaces (e.g., external communication links).

The second processor that can be any appropriate processing means including but not limited to at least one: microprocessor, micro-controller, CISC processor, RISC processor, application specific integrated circuit (ASIC), to name a few. The second processor can be arranged to: receive and evaluate inputs, control outputs, log data, retrieve logged data, and execute programs. The processor of the MT can thus arranged to communicate with any number of circuit components such as: the second time control block, a sleep timer, the second delay timer, the second sequence generator block, a storage circuit (not shown), the second baseband and signal processing block, and/or a memory circuit such as the second memory block. The second memory block can include random access memory (RAM), read-only memory (ROM), as well as non-volatile memory (NVM) such as Flash memory, battery backed up RAM, EEPROM, as well as other NVM type technologies.

The second processor can be arranged to execute program, access data, apply schedules, and/or apply processing logic to activate and deactivate a variety of operating modes as will be described. The programs, schedules, processing logic and any related settings for the MT can be provided in a read-only memory (ROM) that can be loaded into a conventional memory for execution by the second processor, or by some equivalent mechanism such as a non-volatile memory (NVM), a flash memory device, and hard-coded instructions in a micro-controller, to name a few. In another example, the second processor and the second memory block can be replaced with a programmable logic device (PLD), a specially designed circuit such as an application specific integrated circuit (ASIC), as well as others devices that are arranged to provide similar functionality. The processing logic can include procedures for adapting the MT for transmit and capture modes, changing between secure and unsecure communication modes, adapting the frequency, phase and cadence of synthesized carriers, and/or logic for coding/decoding messages.

Although not shown in FIG. 1C, the various input and output mechanisms described previously with respect to the RL may be similarly adapted for use with an MT, including but not limited to the various user input and output devices described previously.

The MT can be operated to send (i.e., transmit) a reply transmission sequence (RSEQ) that consists of a series of coded signals. The coded signals from the second sequence generator in the MT can be keyed from the unique identifier (MT ID Code), similar to the transmit sequence generator in the RL. After the coded sequence is generated for the unique identifier, additional information can be encoded into the reply transmission sequence (RSEQ). Example information in the coded signals can include logged receiver signal strength, logged invalid received signals, receiver frequency and phase, transmit logged data, Doppler measurements or compensation factors, current operating mode selected, etc. The output of the second sequence generator (e.g., TSEQ) can be filtered such as by the second low pass filter (LPF1) prior to coupling the signals to the second transmitter block.

In various examples, the second transmitter block includes a modulator that can be used to modulate data to encode messages. An example modulator may be an angle modulator that is configured to encode data in a rotational phase angle of the transmission signal by a fixed amount relative to an expected transmission phase angle. Another example modulator may be a frequency modulator that is configured to encode data in a carrier frequency of the transmission signal by a fixed amount relative to the expected carrier frequency. In still another example modulator, the second sequence generator can be configured to encode data in the rotational order of samples relative to the expected order of samples used in the reply transmission sequence (RSEQ). In yet another example, data can be encoded for transmission as an offset time relative to an expected transmission by adjusting the transmit time with the delay timer.

The coded signals in the reply message sequence (RSEQ) are transmitted to the RL as a reply transmission signal that can be captured by the RL such that the RL can identify, locate, and receive data from the MT. The MT synthesizes its own internal frequency for transmitting the reply signal using the timing information that was acquired from the captured samples of the interrogation signal from the RL. The timing information that is received from the RL by the MT is Doppler shifted relative to the original transmission frequencies from the RL according to a one way Doppler shift. The resulting synthesized frequency of the MT, while extremely accurate, corresponds to a Doppler shifted version of the original transmission frequencies from the RL. Assuming the same frequency is synthesized by the MT, the RL will effectively be capturing a double Doppler shifted signal. However, the MT is adapted to measure the Doppler associated with the received signals from the RL and pre-compensate the internally synthesized carrier frequencies to effectively subtract off the effect of the double Doppler before the MT transmits signals. Thus, the second transmitter block in the MT is adapted with a High Rate Doppler Adjust block that utilizes the measured or quantized Doppler measurement from the second baseband and signal processing block and the resulting Doppler compensation factor to subtract off the effect of the predicted double Doppler shift. Thus, when the transmissions from the MT are captured and processed by the RL, the RL receives the coded transmission from the MT with a large portion of the double Doppler shift is already removed and the computational burdens are minimized on the RL. This concept will become more apparent from the discussion with respect to FIG. 3B.

The second baseband and signal processing block in the MT can include processing for a correlation process. The correlation process can employ a correlator memory and a correlator. The correlator block may include an FFT correlator and/or a direct-form correlator. The correlator can be preloaded with the appropriate values of the MT ID Code or a corresponding sample pattern prior to a capture interval of the second receiver block in the MT. The next capture interval of the second receiver block can be scheduled by the second processor at a predetermined time, which may be determined (e.g., by the second processor) in part by a delay time (e.g., via secret shared keys between the RL and MT). The correlator can then compare the captured samples from the second receiver block with the sample pattern that was computed or retrieved from memory.

The second baseband and signal processing block in the MT can also include processing for a Doppler process. The Doppler process can employ Doppler Bins and can be adapted to perform Doppler computations to determine a coarsely quantized Doppler value, a residue Doppler value, and a Doppler compensation factor. The Doppler compensation factor can be transmitted in a coded message to the RL. This process will be further described in connection with FIG. 3B.

In some examples, the Doppler process and the correlation process in the MT can be combined into a single process, where the RL correlator may further include Doppler processing capable of processing multiple spins since the duration of the capture interval of the receiver block will be considerably long and the round-trip or doubled Doppler shift may be unknown.

The second baseband and signal processing block may also include a signal analyzer (not shown), which can be arranged to evaluate the outputs from the correlator process and/or the Doppler process using a variety of signal processing techniques (e.g., digital signal processing, analog signal processing, Fast Fourier Transform (FFT), correlation, inverse FFT (IFFT), peak detection, etc.), and determine if the received transmission sequence is identified with the specific MT. When the sequence is appropriately identified with the specific MT, various timing signals can be adjusted such that the frequency and phase of the digitally synthesized transmitter and receiver signal(s) are precisely aligned in the MT.

Information from the coded signals received from the RL can be extracted by the second processor once the captured transmission sequence is validated. Such information can include command and control instructions for the MT such as, for example, set sleep interval to a new time lapse (e.g., 10 minutes), log receiver signal strength, log invalid received signals, log receiver frequency and phase, transmit logged data, change operating mode, switch to secure communications mode, switch to unsecure communications mode, etc.

Example Receiver Correlation

Figure 1D:
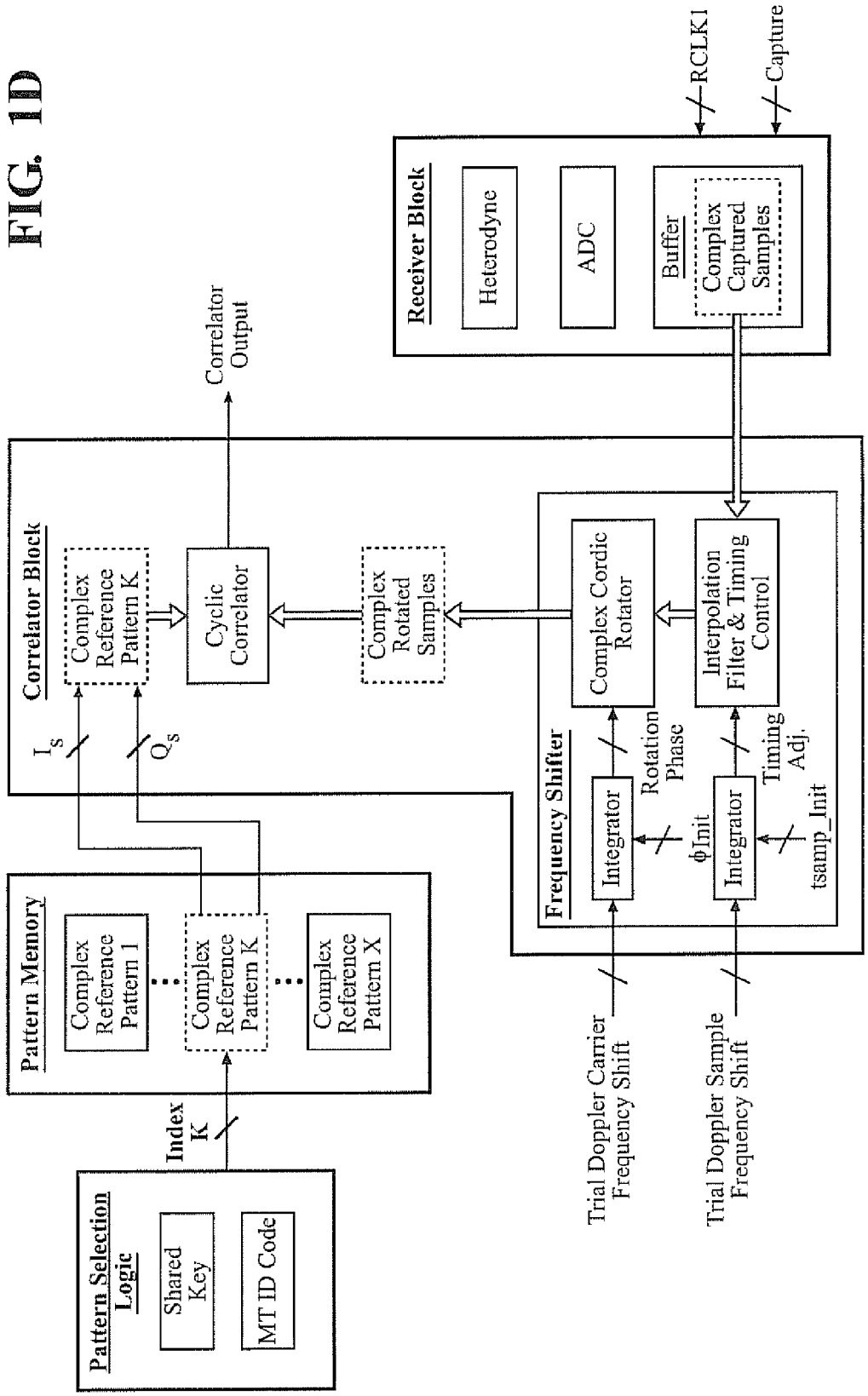
FIG. 1D illustrates the functional operation of an example receiver configured to capture complex samples and correlate the complex captured samples against complex reference patterns.

FIG. 1D illustrates the functional operation of an example receiver configured to capture complex samples and correlate the complex captured samples against complex reference patterns in accordance with at least some examples described herein. The operation of the receiver may include a pattern selection logic block, a pattern memory block, a correlator block, and a receiver block.

The pattern selection logic block in FIG. 1D can be configured to generate an index (e.g. index K) that can be used to select a complex reference pattern that was previously stored in memory. The pattern selection logic block may utilize a shared key and the unique identifier (MT ID Code) associated with a specific MT. The pattern selection logic block may also utilize other factors such as time-date stamps or other function to create a dynamically generated an index K that can be used to select a complex reference pattern.

The pattern memory block in FIG. 1D can be configured to store one or more complex reference patterns, which are illustrated as Complex Reference Pattern 1 . . . . Complex Reference Pattern K . . . . Complex Reference Pattern X. The reference patterns each correspond to normalized complex samples that match the samples that are expected to be transmitted by an RL. One of the previously stored complex reference patterns (e.g., Complex Reference Pattern K) can be retrieved from the pattern memory block using the index (e.g., Index K) from the pattern selection logic block. The retrieved complex reference sample pattern may include normalized samples of both in-phase (IS) and quadrature-phase (QS) portions of a previously stored reference pattern.

The Receiver Block in FIG. 1D is configured to operate from a receiver clock (RCLK1) and capture signals when a capture (CAPTURE) signal is asserted. The signals processed by the receiver block can be heterodyned into complex analog baseband signals (e.g., IA, QA) and quantized into complex digital data (e.g., ID, QD) with an analog-to-digital converter (ADC), to generate captured complex samples.

The correlator block in FIG. 1D is configured to correlate samples from the complex reference pattern (e.g., Complex Reference Pattern K) retrieved from the pattern memory block against the complex captured samples generated by the receiver block. The correlator block includes a cyclic correlator. A number of trial Doppler frequency shifts can be applied by the cyclic correlator until the complex reference pattern K is determined to correlate with the captured complex samples. Once the correlator output indicates that a correlation has been found, the trial Doppler frequency shift is determined and can be integer quantized (e.g., to a number of bits such as in a range of about 4 bits to about 9 bits or so) to provide a quantized Doppler measurement.

One detail is that Doppler shift applies proportional to the carrier frequency and the various baud rates so that all timings in the MT are contracted or expanded in the same proportion. For example, when an MT adapts the transmission characteristics of the transmitter to the synthesized timings based on the received/captured signals from the RL, the Doppler shift due to the relative velocity difference between the MT and the RL affects all of the various transmission characteristics proportionally. Example transmission characteristics that are affected include carrier, frequency, phase and cadence, to name a few.

Another implementation consideration is that there is a ratio between the carrier cycles and the captured samples that can be quite different from unity. For example, a carrier frequency of 915 MHz might correspond to a sample rate of 26.142856 MHz, which corresponds to a ratio of about 35.

In each of the example correlators described herein, the correlation of the complex reference pattern can be compared against complex captured samples. However, it is important to note that the transmission of the reference patterns in a communication signal is encoded in a modulated carrier wave (both I and Q portions), which is traveling though space between transponder and locator which may move relative to one another with great relative velocities difference. In other words, it is expected that there will likely be some large amount of Doppler shift between the transmission and reception of the signals, which can be accounted for in the correlator processing. The amount of frequency difference or intra noise pattern rotation due to Doppler shift requires correlator processing to heterodyne or spin in either positive or negative frequency. For example, at 915 MHz with a sample pattern that lasts for about 100,000/25 MHz or about 4 milliseconds, then modest Doppler shifts of movement at 100 meters/second (e.g., a slow moving airplane) times 2 for round trip transmission reception would give a total potential intra-packet rotation of 2.44 turns or spins, while faster moving aircrafts or spacecrafts may have tens or hundreds of turns or spins due to the higher relative velocities.

In order to account for the intra-packet rotation, the correlation processing may utilize a frequency rotator or frequency shifter that calculates trial spins (either positive or negative) across the packet of ±0, 1, 2, 3, 4, etc. This variable rotation or spin is a function of time, or frequency shift. Note also that with large Doppler values, the symbol or sample timing of received patterns will also change in proportion to their frequency ratio. Thus, if a carder wave at 915 MHz is shifted so that, across a sample pattern the pattern has to be twisted 70 turns to achieve correlation, then if there are 35 carrier waves per sample, the sample timing has to slide by 2 samples from one end to the other of the sample pattern to preserve the packet structure. This sliding can be done with interpolators similar to those used in the tag transmitters.

A frequency shifter block can be adapted to provide the trial Doppler frequency shifts in the correlator block. The frequency shifter block can be arranged to either generated complex rotations of the complex reference pattern from the pattern memory, or the complex captured samples from the receiver block. For the example illustrated in FIG. 1D, the output of the receiver block is coupled to an input of the frequency shifter, and an output of the frequency shifter block is arranged to provide complex rotated samples to an input of the cyclic correlator.

The frequency shifter block illustrated in FIG. 1D includes an interpolator that can be implemented as an interpolation filter with timing control. An example interpolator is described with reference to FIG. 2B. The frequency shifter block also includes a complex cordic rotator. An output of the interpolator is coupled to an input of the complex cordic rotator. An output of the complex cordic rotator is coupled to an input of the cyclic correlator, and arranged to provide the complex rotated samples that corresponds to the trial Doppler frequency shifts. The interpolation filter with timing control is arranged to interpolate the complex captured samples using a timing adjusting signal. The timing adjustment signal is provided from an output of an integrator that is arranged to integrate a trial Doppler sample frequency shift using an initial sample timing value of $t_{SAMP\_INIT}$. The complex cordic rotator is arranged to rotate the interpolated complex captured samples using a rotation phase signal that is associated with trial Doppler shifts in the carrier frequency. The timing adjustment signal is provided from an output of an integrator that is arranged to integrate the trial Doppler carrier frequency shift using an initial phase value of $\Box_{INIT}$.

In some examples, an input of the interpolation filter can be coupled to an output of the buffer in the receiver block and arranged to process the complex captured samples. However in other examples as will be described in FIG. 1E, the frequency shifter can be arranged such that the complex captured samples are coupled to the cyclic correlator and the complex reference pattern could be coupled to the frequency shifter.

Example Correlators

Figure 1E:
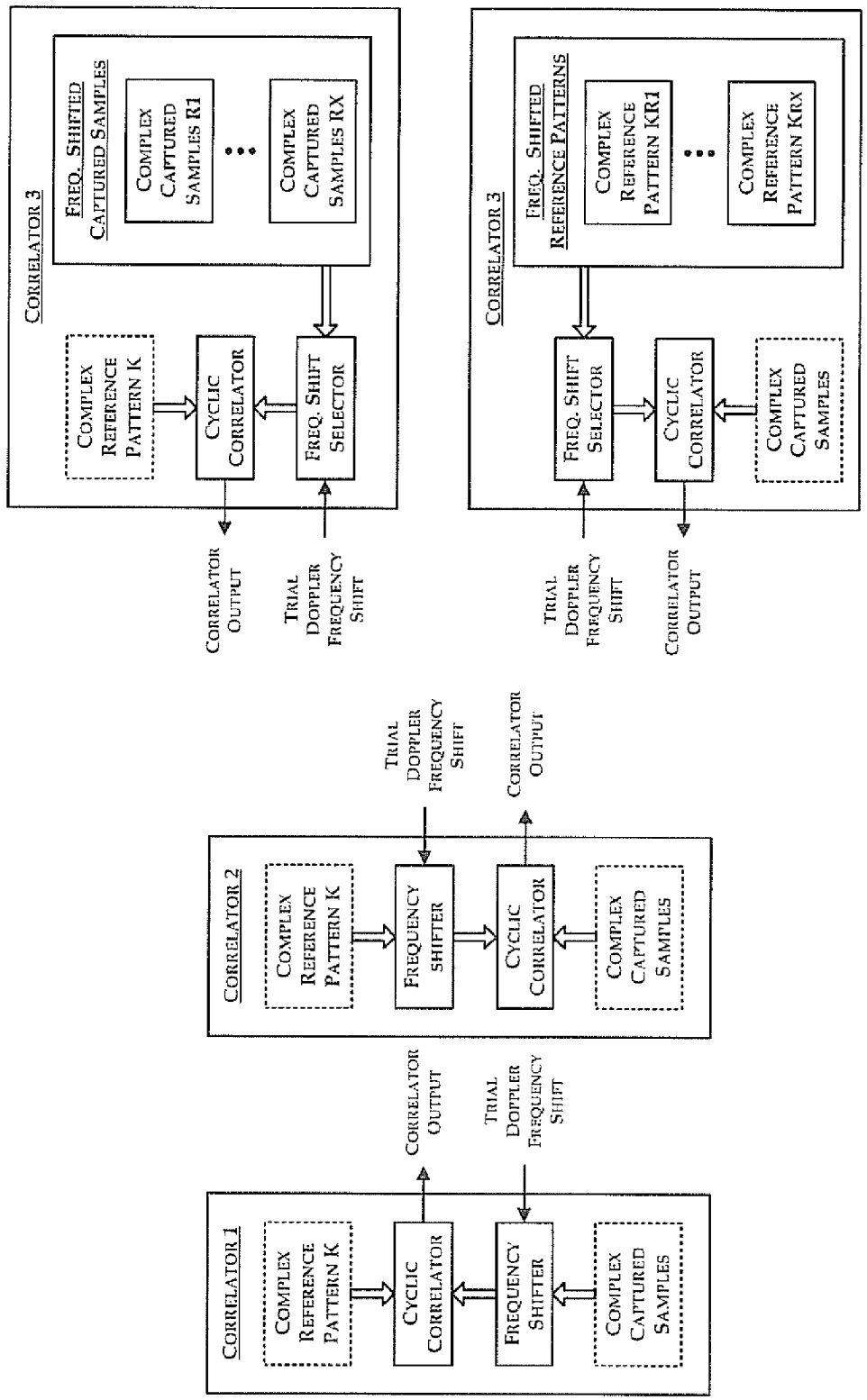
FIG. 1E illustrates example correlator blocks that can be used to correlate complex captured samples against complex reference patterns.

FIG. 1E illustrates example correlator blocks that can be used to correlate complex captured samples against complex reference patterns in accordance with at least some examples described herein.

In a first example correlator block (Correlator 1), captured samples such as from a receiver are provided to a frequency shifter block, which is configured to frequency shift the captured samples by a specified number of trial Doppler frequency shifts. For a given trial spin, the frequency shifter provides the frequency shifted complex captured samples to the cyclic correlator block, which correlates the previously selected complex reference pattern K against the frequency shifted complex captured samples. Correlator 1 can be configured to continue attempting different trial Doppler frequency shifts until either correlation is found, or all of the trial Doppler frequency shifts are attempted without finding a correlation.

In a second example correlator block (Correlator 2), the selected complex reference pattern K from a pattern memory block) can be provided to a frequency shifter block, which is configured to frequency shift the complex reference pattern by a specified number of trial Doppler frequency shifts. For a given trial Doppler frequency shift, the frequency shifter provides the frequency shifted sample pattern to the cyclic correlator block, which correlates the frequency shifted complex reference pattern K against the complex captured samples. Correlator 2 can be configured to continue attempting different trial Doppler frequency shifts until either correlation is found, or all of the trial Doppler frequency shifts are attempted without finding a correlation.

In a third example correlator block (Correlator 3), complex captured samples such as from a receiver block are provided to a frequency shifter block (not shown), and all trial frequency shifts or spins are determined before correlation, and perhaps stored in a memory block (not shown). For example, Complex Captured Samples R1 may correspond to a first trial spin of 0, while other Complex Captured Samples RX may correspond to non-zero trial spins (e.g., +10, +2, −2, −10, etc.). In this example a frequency shift selector can be used to select one of the frequency shifted complex captured samples from the buffer or memory for correlation, where the cyclic correlator block correlates the previously selected complex reference pattern K against the frequency shifted complex captured samples (Complex Captured Samples R1, R2, R3, etc.). Correlator 3 can be configured to continue attempting different trial Doppler frequency shifts until either correlation is found, or all of the trial Doppler frequency shifts are attempted without finding a correlation.

In a fourth example correlator block (Correlator 4), a previously stored complex reference pattern may have been previously shifted by a frequency shifter block (not shown), where all trial Doppler frequency shifts or spins for each pattern are determined before correlation, and perhaps stored in a memory block (not shown). For example, Complex Reference Pattern KR1 may correspond to a first trial spin of −2, while Complex Reference Pattern KRX may correspond to a second trial spin of +6. In this example, a frequency shift selector can be used to select one of the frequency shifted complex reference patterns from a buffer or memory for correlation, where the cyclic correlator block correlates the selected frequency shift of the Complex Reference Pattern K against the complex captured samples. Correlator 4 can be configured to continue attempting different trial Doppler frequency shifts by retrieving different complex reference patterns from the buffer or memory until either correlation is found, or all of the trial Doppler frequency shifts are attempted without finding a correlation.

Example Transmitter

Figure 2A:
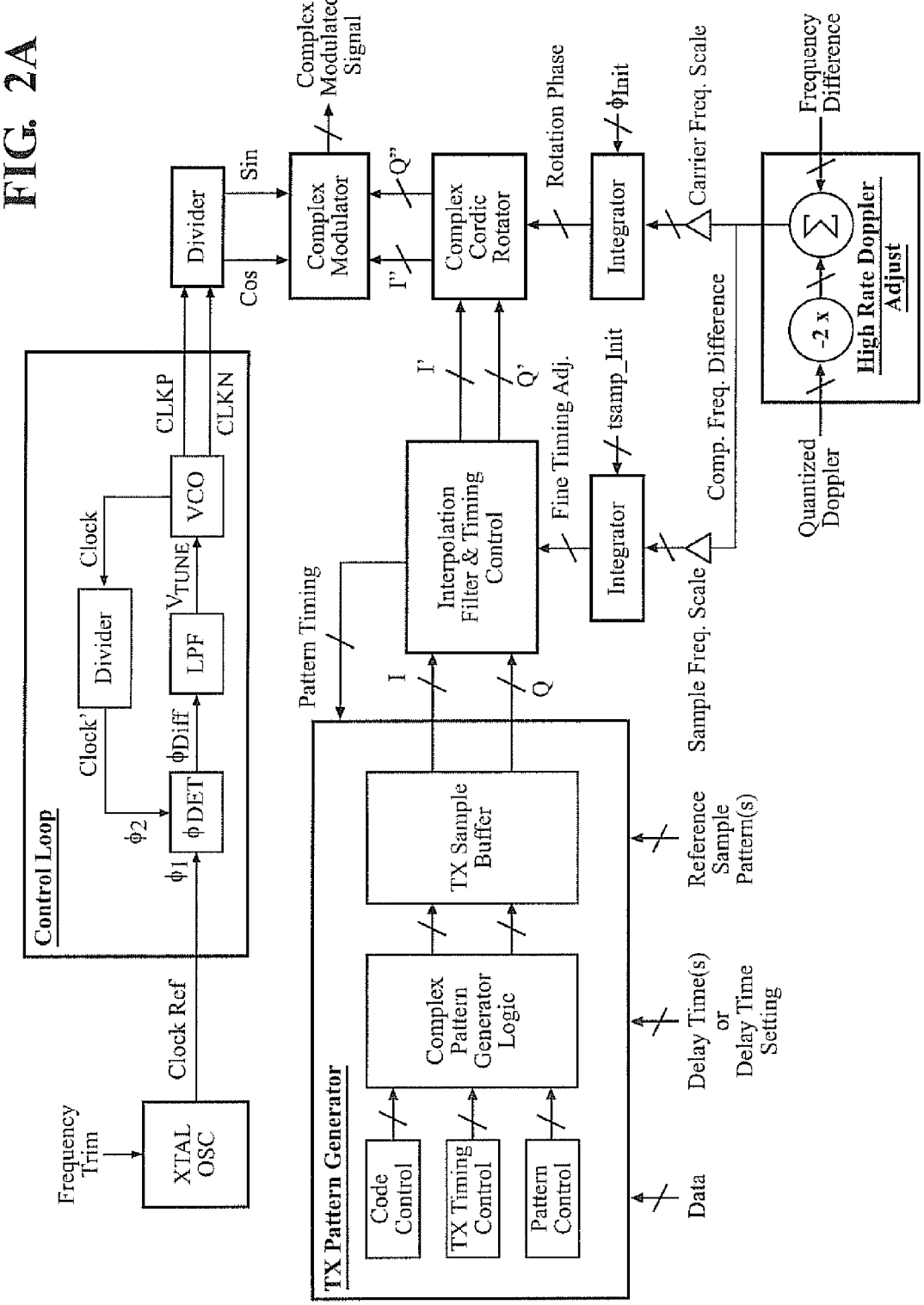
FIGS. 2A and 2B illustrate various portions of an example transmitter.
Figure 2B:
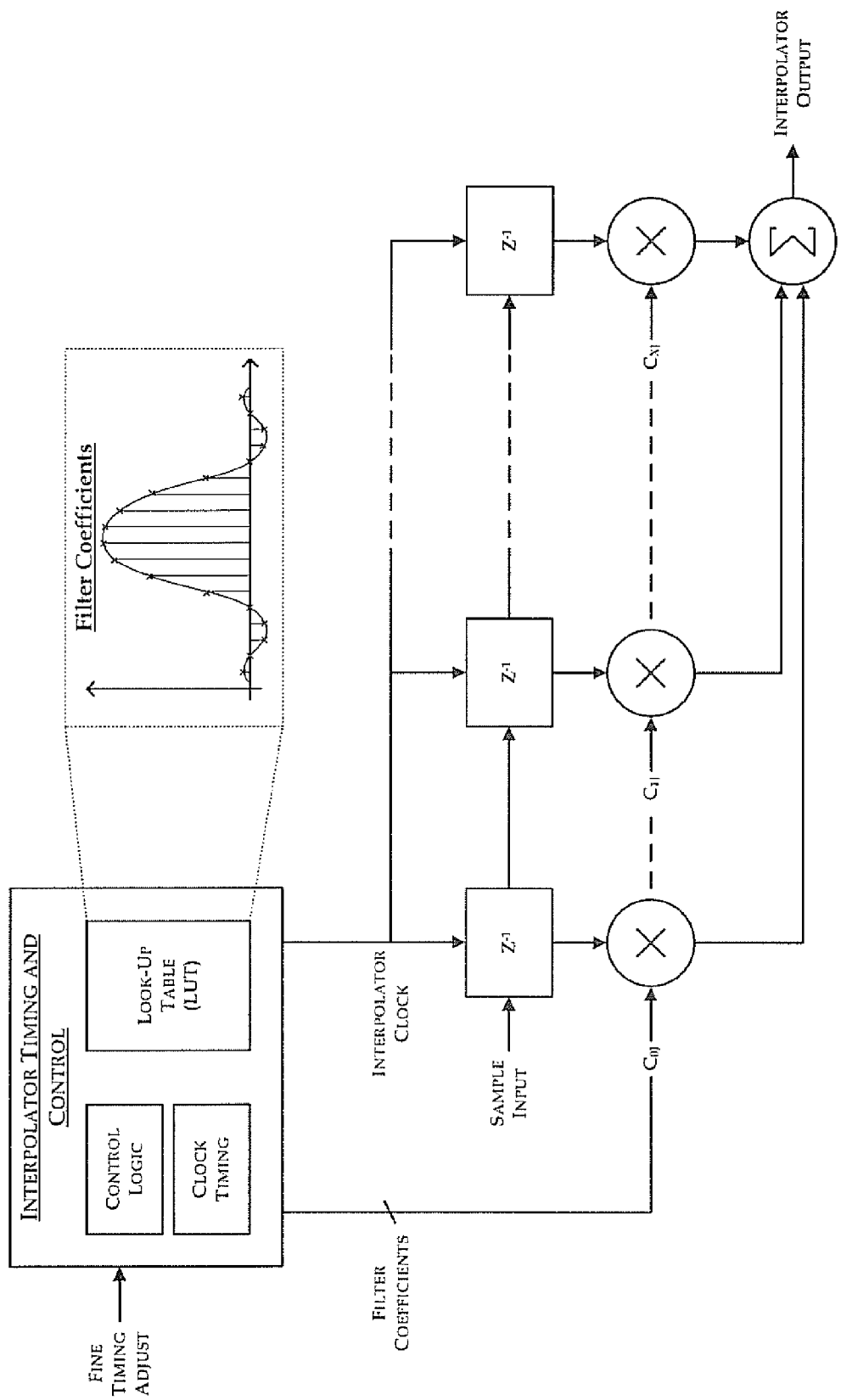

FIGS. 2A and 2B illustrate various portions of an example transmitter that can be configured in accordance with at least some examples described herein. FIG. 2A shows the overall transmitter topology, while FIG. 2B shows an example interpolator. The example transmitter includes a crystal oscillator (XTAL OSC), a timing control circuit, a complex modulator, a transmit pattern generator, an interpolation filter with timing control, first and second integrators, a high rate Doppler adjust block, first and second scaler blocks, and a complex cordic rotator.

For the example illustrated in FIG. 2A, the sequence generator is included as part of the transmitter in the transmit pattern generator. However, in other examples such as illustrated in FIGS. 1B and 1C, the functions of sequence generator and transmitter can be separated.

The crystal oscillator is arranged to provide an oscillator signal as a clock signal (CLOCK REF) having a first phase ($\phi_1$) for the timing control circuit. In one example the crystal oscillator has a nominal frequency around 26.14 MHz, which can optionally be adjustable (e.g., via signal FREQ. TRIM). The oscillator can be a crystal-type oscillator, or any other oscillator that has a substantially stable oscillation frequency.

The timing control circuit includes a feedback control loop with an optional divider circuit that is arranged to synthesize a frequency. The control loop includes a phase detector, a low pass filter (LPF), a voltage controlled oscillator (VCO), and an optional divider circuit. The phase ($\phi_1$) of the reference clock signal (e.g., $CLOCK_{REF}$) is compared to a phase ($\phi_2$) from a feedback signal (e.g., CLOCK') by the phase detector to determine if the resulting clocks signal (CLOCK) is operating in phase with the reference clock ($CLOCK_{REF}$). The output of the phase detector corresponds to a phase difference signal ($\phi_{DIFF}$), which is provided to the low pass filter to generate a control voltage ($V_{TUNE}$) for the VCO. The VCO is configured to adjust the output frequency of clock signals CLKP and CLKN, which are out of phase with one another by 180 degrees. The feedback signal (CLOCK) is also provided from the VCO to the optional divider circuit. The output of the optional divider circuit is provided to the phase detector as signal CLOCK', which closes the control loop. Moreover, the VCO frequency can optionally be provided to another divider circuit, which generates synthesized frequencies that are associated with a sine and cosine function.

In one example, the VCO has a nominal output frequency of 1.83 GHz, the feedback loop divider circuit has a divide ratio of 70, and the phase detector is arranged to adjust the $V_{TUNE}$ signal via the low pass filter such that the average value of the 26.14 MHz signal is matched to 1.83 GHz/70. Other reference signals can be employed to yield the same result by adjusting the divider ratio in the control loop divider circuit. Moreover, the output of the VCO can be further adjusted by the output divider circuit (e.g., divide ratio of 2) to yield synthesized frequencies corresponding to SIN (915 MHz) and COS (915 MHZ) or any other desired frequency.

The transmitter (TX) pattern generator may include a code control block, a transmitter (TX) timing control block, a pattern control block, a complex pattern generator logic block, and a transmitter (TX) sample buffer black. The code control block can be arranged to provide the pre-determined patterns, keyed from the MT ID Code, for "A", "B", and "C" sequenced patterns as will be described later. In some examples, the complex pattern generator logic block can be configured to generate complex numbers (e.g., I and Q) from the codes based on the timing signals (pattern timing) for sequencing the pattern. For example, the complex pattern generator logic block can be arranged to provide 2047 sets of complex numbers that are stored as samples in the TX sample buffer block. In some other examples, the sets of complex numbers can be retrieved from a memory that is loaded into the TX sample buffer block as a reference sample pattern. The output of the TX sample buffer block (I and Q) can be provided to an interpolation filter and timing control block, which can be arranged to adjust the fine timing associated with the I and Q signals, and provides I' and Q', which are associated with a complex interpolated baseband signal. An integrator circuit can be used to integrate the difference between the transmitted and received frequencies to adjust the fine timing (fine timing adjust).

As illustrated in FIG. 1C, a MT can utilize a quantized Doppler measurement to adjust the transmitter to pre-compensate for Doppler. As sown in FIG. 2A, an example high rate Doppler adjustment block may include a summer and a multiplier that are configured to numerically generate a compensated frequency difference according to the formula: (Compensated Frequency Offset) (Frequency Offset)−2× (Quantized Doppler Measurement). The first scaler block is configured to scale the compensated frequency difference with a sample frequency scale factor to generate a first scaled frequency difference, while the second scaler block is configured to scale the compensated frequency difference with a carrier frequency scale factor to generate a second scaled frequency difference. The first integrator block is configured to integrate the first scaled frequency difference using an initial sample timing value of $t_{SAMP\_INIT}$ to generate a fine timing adjustment signal for use by the interpolator. The second integrator block is configured to integrate the second scaled frequency difference using an initial phase value of $\square_{INIT}$ to generate a phase adjustment signal (Rotation Phase) for use by the complex cordic rotator.

The interpolator can be configured to provide fine timing adjustment for the I and Q complex numbers (e.g., 8192/2047) that are generated by the TX pattern generator, and may also be configured to provide low-pass filtering for the transmitter. An example of interpolation functions is shown in FIG. 2B, where the example interpolator includes an interpolator timing and control logic block, and a finite impulse response (FIR) interpolation filter that can be implemented by a digital signal processor (DSP) or some other similar device.

The interpolator timing and control block can include a control logic block, a clock timing block, and a look-up table (LUT). The control logic block is configured to retrieve filter coefficients from the look-up table based on the fine timing adjust signal, where the fitter coefficients can correspond to a transverse polyphase filter. The clock timing block can be configured to generate an interpolator clock for the filter, which may have a series of delay elements, multipliers and summers as illustrated. The filter is adapted to generator an interpolator output by applying the filter coefficients to the input signal, which can correspond to the sample input for either I or Q signals.

The interpolated complex baseband signals (I' and Q') can be provided to the cordic rotator. The cordic rotator is configured to adjust the rotational phase of the complex baseband signals (in the digital domain) in response to a phase adjustment signal (e.g., rotation phase). The output of the complex cordic rotator is a frequency shifted complex baseband signal (I" and Q"), where the frequency shifting is undertaken by the digital synthesis operations by the interpolation filter and the cordic rotator.

The complex modulator can be arranged to receive the frequency shifted complex baseband signals (I" and Q"), and the sine and cosine timing signals to provide a modulated signal output. The modulated signal output can be provided to a power amplifier (not shown) that is coupled to an antenna for transmission of the modulated signal. The various timing control signals (e.g., clock frequency, clock phase, clock offset) are adjusted such that the rate, fine-timing, and phase of the modulated signal output has sufficient timing information embedded in the resulting signal.

The code control block can be configured to generate the transmitter sequence using the unique identifier (MT ID Code) associated with an MT or a group of MTs when the transmitter is operated in a reduced security communication mode. In one example, the unique identifier is provided to a polynomial generator. In another example, the unique identifier is stored in a volatile memory. In yet another example, the unique identifier is stored in a non-volatile storage such as a flash memory device, a ROM, an EPROM, an EEPROM, a dip-switch, or some other means. In still another example, the pattern (e.g., Reference Sample Pattern) that was created with the MT ID code is stored in a memory device or a look-up table that can be keyed to the unique identifier.

The pattern control block can be configured to generate the transmitter sequence using a previously determined reference sample pattern when the transmitter is operated in a high security communication mode. The selection of the reference sample pattern can be determined based on the unique identifier (MT ID Code), a secret key that is shared with the RL and MT or some other suitable security method that provides a matched selection of one of a reference sample pattern that is mutually known by the RL and the MT without any further communication between the RL and the MT. In one example, one of the reference sample patterns can be selected for transmission by loading the reference sample pattern in the TX sample buffer. In another example, one of reference sample patterns can be selected for transmission, and data can be rotationally encoded in the selected noise sample pattern before loading the noise samples into the TX sample buffer.

The TX timing control block can be configured to delay the transmitter sequence from being generated and/or transmitted in response to a selected one of the delay time settings. The selection of the delay time(s) can be determined in a similar manner to the selection of the noise sample patterns when the transmitter is operated in a high security communication mode. For example, the selection of the delay settings can be determined based on the unique identifier (e.g., MT ID Code), the secret key that may be commonly shared with the RL and MT, or any other suitable method that provides a matched selection of one of the reference sample patterns by the RL and the MT without any further communication.

Example Transmission Sequence

Figure 3A:
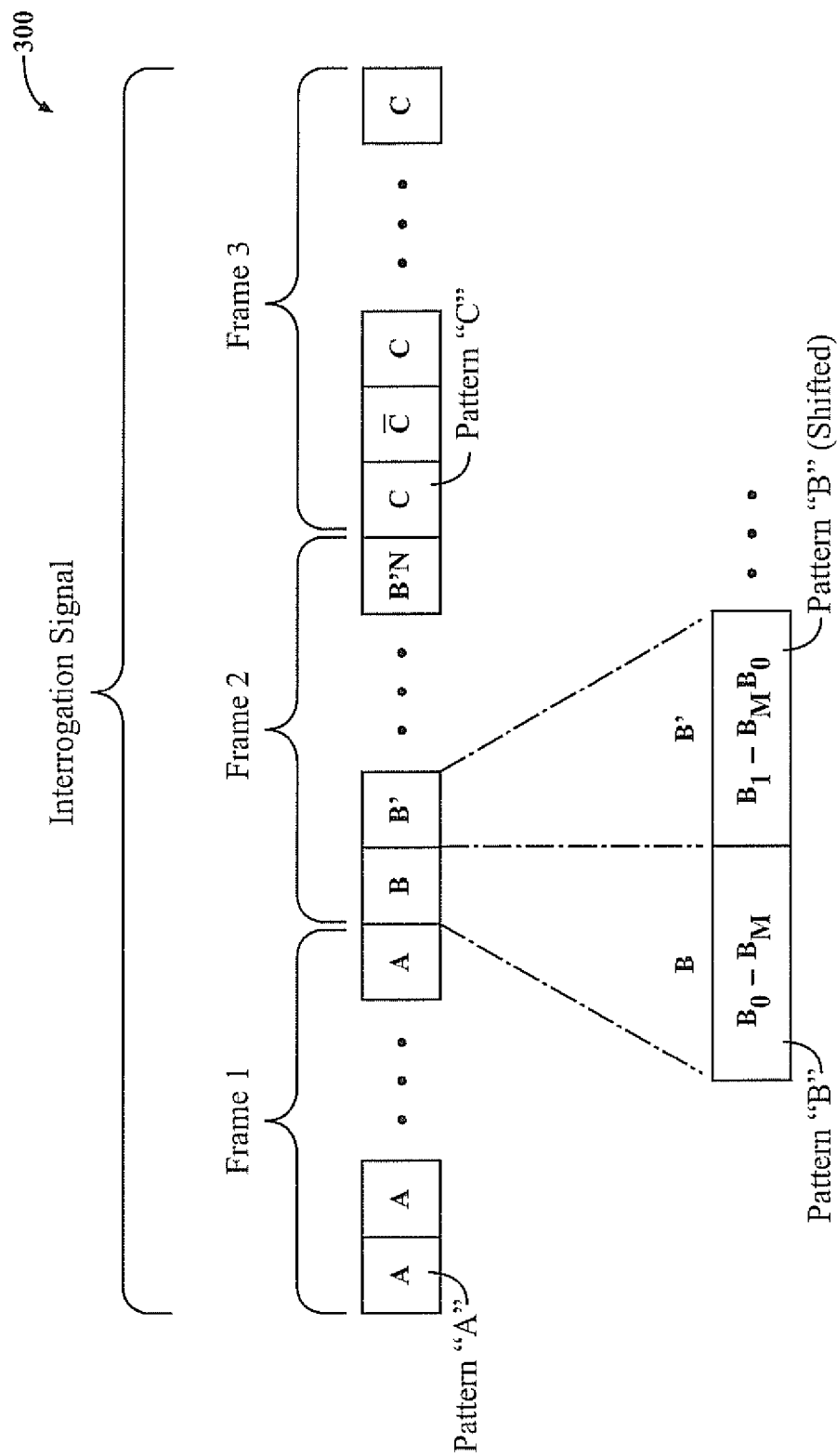
FIG. 3A is a diagram illustrating an example interrogation signal.

FIG. 3A is a diagram illustrating an example interrogation signal that is arranged in accordance with at least some examples described herein. The interrogation may correspond to a set of frames formatted for transmission, where a frame corresponds to a time-period for which a sequence is transmitted. For the example of FIG. 3A, transmissions can be broken into three sequential frames. During a first time-period, a first frame (i.e., "frame 1") is transmitted that consists of a first transmission sequence (i.e., "sequence A"). Sequence A consists of a repeated set of patterns that are in a sequential series, where each pattern (pattern A) is substantially identical. During a second time-period, a second frame (i.e., "frame 2") is transmitted that consists of a second transmission sequence (i.e., "sequence B"). Sequence B consists of a repeated set of patterns that are in a sequential series, where each subsequent pattern in the sequence is shifted as will be described later. During a third time-period, a third frame (i.e., "frame 3") is transmitted that consists of a third transmission sequence (i.e., "sequence C"). Sequence C consists of a repeated set of patterns, where each pattern (pattern "C") forms part of an encoded message as will be described later. The collection of the three sequential frames in a transmission can be referred to as an interrogation signal.

Each MT in the system has a unique identifier (e.g., MT ID Code can be implemented as an M-bit address) that is used to uniquely designate a specific MT. In one example, the unique identifier is a 33-bit address code that yields approximately 8.58 billion unique identifiers. The M-bit address can be dispersed over the various patterns. In one example, a 33 bit code is evenly dispersed over the three sequences such that 11-bits are coded in "sequence A", 11-bits are coded in "sequence B", and 11-bits are coded in "sequence C". In another example, the codes are not evenly dispersed over the transmission sequence. In still another example, the same code is used for each of the patterns. Each symbol that is transmitted is thus encoded according to the respective coding bits for the corresponding sequence portion. The terms "baud" and "chip" can also be used to refer to symbols.

The correlation of sequence "A" is used to verify that the first portion (e.g., the first 11-bits or bits 0-10) of the unique identifier is coded in the transmission. When a correlation is detected, fine baud and carrier timing can be derived. However, the MT has no prior timing information (e.g., no gross frame timing is known). Since the "A" pattern is repeated over the first-time interval, it is possible to accumulate the signals by adding them on top of one another before correlation is performed such that signal sensitivity is improved. In one example MT, the accumulation of signals is unnecessary. In another example MT, the accumulation of signals is performed during a repetitive tracking mode.

Once the "A" pattern has been acquired, the MT continues sampling to locate the "B" sequence. The correlation of sequence "B" is used to verify that the second portion (e.g., e.g., the second 11-bits or bits 11-21) of the unique identifier is coded in the transmission. As previously described, the "B" sequence is shifted over time. For example, a first B sequence includes coded bauds B0, B1, ..., BM, while the second B sequence (B') includes coded bauds B1, B2, ..., BM, B0. When correlation is achieved with the MT's "B" sequence, the MT identifies a stream position within the "B" sequence. Once the transmission stream position is determined from the shift pattern, the MT schedules the reception of sequence "C", whose arrival can now be predicted.

For the above described "B" sequencing example, a single baud shift is used between subsequent transmissions. Other shifting methods can be used such that the step size for shifting between subsequent transmissions can be a different integer number of baud shifts (e.g., 2, 3, 4, etc.) or a non-integer number of baud shifts (e.g., ½ baud, ¾ baud, 1½ baud, 2¼ baud, etc.) or a shift in samples of either an integer or non-integer variety. In another example, the shifting mechanisms between subsequent transmission can be replaced by a carrier phase rotation, where each subsequent transmission has the carrier phase rotated by a fixed amount.

Frame "C" has a third portion of the unique identifier encoded therein, and possible command and control data for the MT (or other data for the RL). The correlation of sequence "C" is used to verify the third portion (e.g., the third 11-bits or bits 22-33) of the unique identifier is coded in the transmission. The "C" sequence can also be very slowly modulated with a few bits of data. For example, up to 63 bits of data and error correction code (ECC) can be transferred in sequence "C". In one example, the chips or transmit symbols are encoded by inverting or not-inverting patterns of "C" in the transmission frame. Examples of coded command and control information were previously described above.

For the above described "C" sequence, data is encoded using an inverting and non-inverting encoding method. Other data encoding methods can be used such as encoding the data with a shifting bit pattern similar to the "B" sequence. For example, a "000" binary code can be encoded, and each increment in the binary code is the same pattern shifted by an incremental shift step (e.g., ½ baud step, 1 baud step, 2 baud step, etc.). The data message nominally in "C" can be encoded with a pattern timing changes as in the nominal section "B" previously described.

In an unsecure communication mode the MT can transmit sequences A and B in substantially the same format as that described above. However, since the RL initiated the transmission and does not have a "wake-up" period creating an ambiguity in when reception begins, the transmission sequence from the MT can be shorter overall. The shortened transmission period can be used to minimize the MT's energy consumption. Frame "C" is similarly formatted, but may include other reported data such as: current temperature, heart rate, blood pressure, Doppler measurement, operations statistics, etc. In a secure communication mode, the MT may not transmit the sequences A, B, and/or C, and instead may transmit a mutually known reference sample pattern once a mutually known predetermined time delay expires after receipt of the interrogation signal.

The timing and carrier signals for transmission in the MT are derived from the RL's clock as measured against the internal MT clock. The RL in turn correlates these signals, similar to the MT, and determines the exact round-trip time. The RL also determines deviations in the signal timing with respect to its own clock, which the MT attempted to mimic. The deviation in the signal timing is a consequence of Doppler shift, noise, and oscillator instability.

An example system has the following general information for a transmission:

Received Frame consists of 4096 samples, 2047 baud;
Received Sample Rate is 25.777M complex samples/sec;
Transmitted Sample Rate is 2×25.777M complex samples/sec;
Baud Rate is determined by Sample Rate×(2047/2048)/2=12.8822 Mbaud symbols/sec, QPSK; and
Frame Period is 158.98 µs.

An example system has the following RL TX parameters for a transmission:
- "A" sequence is 2.2263 seconds long, (13×1024 frames), repeated un-shifted with one of 2047 first address portions;
- "B" sequence is 317.96 ms long (2000 frames), repeated shifted with one of 2047 second address portions; and
- "C" sequence is 10.174 ms long (64 frames), repeated un-shifted with one of 2047 third address portions, frames inverted according to modulated data.

An example unsecure system has the following MT TX parameters for a transmission:
- "A" sequence is 81.397 ms long, (512 frames);
- "B" sequence is 20.349 ms long (128 frames); and
- "C" sequence is 10.174 ms long (64 frames), repeated un-shifted with one of 2047 third address portions, frames inverted according to modulated data.

Figure 3B:
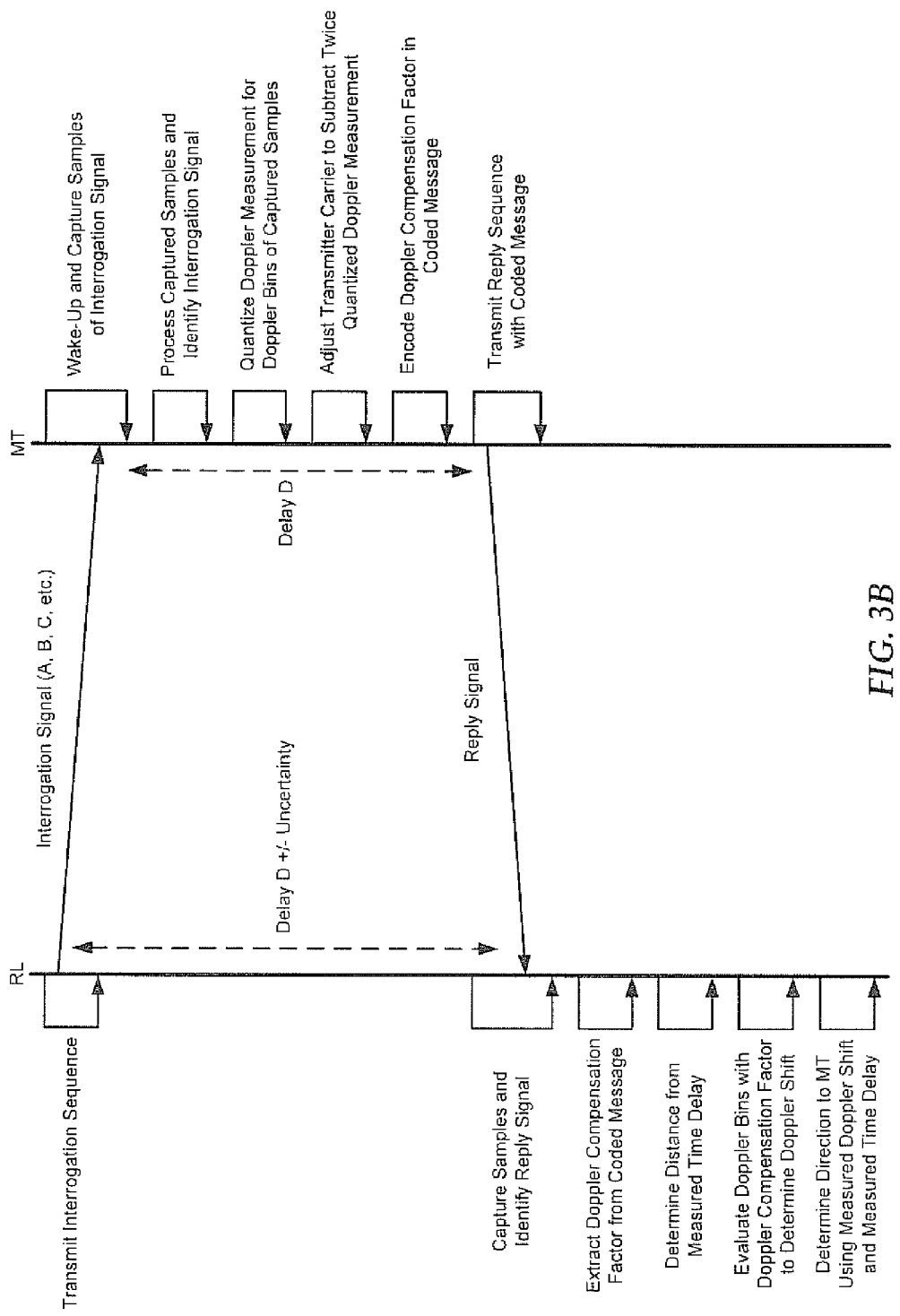
FIG. 3B illustrates example operations that may be performed following the transmission of the example interrogation signal.

FIG. 3B illustrates example operations that may be performed following the transmission of the example interrogation signal that is adapted in accordance with at least some examples described herein.

As shown in FIG. 3B, the RL may be configured to perform the following operations: "Transmit Interrogation Sequence", Capture Samples and Identify Reply Signal", "Extract Doppler Compensation Factor from Coded Message", "Determine Distance from Measured Time Delay", "Evaluate Doppler Bins with Doppler Compensation Factor to Determine Doppler Shift", and "Determine Direction to MT Using Determined Doppler Shift and Measured Time Delay". Similarly, the MT may be configured to perform the following operations: "Wake-up and Capture Samples of Interrogation Signal", "Process Captured Samples and Identify Interrogation Signal", "Quantize Doppler Measurement from Doppler Bins of Captured Samples", "Adjust Transmitter Carrier to Subtract Twice Quantized Doppler Measurement", "Encode Doppler Compensating Factor in Coded Message", and "Transmit Reply Sequence with Coded Message."

As shown in FIG. 3B, the RL initiates communication by transmitting an interrogation signal, which may be formatted as a transmission sequence as described previously with respect to FIG. 3A. If the MT is active in a Wake-Up Cycle, the MT can capture samples of the interrogation signal from the receiver and process the captured samples to detect the interrogation signal. Once the interrogation signal is detected, the MT can evaluate the Doppler Bins corresponding to the captured samples and determined a coarse measurement of Doppler. The Doppler Measurement is quantized into a desired number of bits (e.g., 5 bits), which can be subtracted from the various frequency/phase offsets (see FIG. 2A) in the transmitter so that the carrier wave generated by the transmitter in the MT effectively is compensated to remove twice the Quantized Doppler Measurement from the carrier wave. The Quantized Doppler Measurement or a Doppler Compensation Factor Corresponding to twice the value of the Quantized Doppler Measurement can then be encoded in a message that can transmitted to the RL as part of a reply signal. After processing is completed, a reply sequence can be generated that includes the coded message, and the reply sequence can be transmitted as a reply signal. The RL captures samples of the signal spectrum and identifies the reply signal in the capture samples, and extracts the Doppler Compensation Factor from the Coded Message. The RL can further determine a distance between the RL and the MT based on the roundtrip time-of-flight between the RL and MT. The RL also evaluates Doppler Bins to Determine the Doppler Shift using the Doppler Compensation Factor to reduce the overall computational overhead. Once the Doppler Shift and the Measured Time Delay are determined, the RL can determine the position of the MT.

In some examples the Delay between receipt of an interrogation signal and the transmission of the reply sequence can be adjusted according to a predetermined delay D that can be mutually known by the RL and the MT using a secret shared key. For example, after Delay D, the MT can transmit a reply sequence using the precisely determined carrier, phase, frequency, timing and cadence that is determined from the interrogation signal, and as adjusted using the Quantized Doppler Measurement. The RL can similarly wait for the expiration of Delay D (±the uncertainty) relative to the transmission of the interrogation signal to begin the capture interval to evaluate samples that are expected to correlate with Reply Signal.

A numerical example of Doppler Shift Measurements and Compensation will make the above scenario clearer. Assume we have a satellite approaching at a speed of 4.56789 km/s. From the perspective of the MT on the ground, a Doppler shift of about +15.237 ppm is observed with a perceived frequency offset of about +13.941824 KHz.

For this example, an uncompensated Doppler system would result in the MT transmitting a signal that is Doppler shifted once for communication of the interrogation signal from the RL and the MT, and a second time for communication of the reply signal from the MT to the RL, yielding a Double Doppler Shift. For a carrier frequency of 915 MHz, the interrogation signal Doppler shift for the RL to MT path is given as 915 MHz×1.000015237=915.01394182 MHz. The path for the reply signal from the MT to the RL is similarly shifted again by 15.24 ppm, which can be ideally represented as 915.01394182 MHz×1.000015237=915.027883648 MHz. Thus, the overall round trip Doppler is about +30.474 ppm.

For this same example, a Doppler compensation method in accordance with the present disclosure can be analyzed as follows: Assuming we have a MT with an oscillator frequency that is accurate to about ±1 ppm. With the reduced RL computation scheme, the MT can use an integer ppm quantization (e.g., rounding functions) to quantize about +15 ppm Doppler Measurement out of the possible +15.24 ppm Doppler Shift. The 15 ppm can be subtracted from the carrier wave so that the carrier frequency, which is ideally 915 MHz, can be determined as follows: 915.01394182 MHz−27.45 KHz=914.98649182 MHz. This Quantized Doppler Measurement (15 ppm) can be coded in a transmission that is sent to the RL. When the carrier is received at the RL, the perceived frequency is again shifted up by 15.24 ppm, but our shifted carrier is determined as: 914.98649182 MHz×1.000015237=915.0004362141 MHz. This is read by the RL as a relatively small Doppler shift of about 0.476736 ppm. The data sent to the locator indicates that twice 15 ppm was subtracted out, and that 30 ppm must be applied. Applying 30 ppm to the received Doppler gives +30.47675 ppm as the round trip Doppler. Dividing this in half, yields 15.238375 ppm which is a very good approximation of Doppler using the computation reduction scheme described herein. The number of bits of resolution in the quantized Doppler Measurement may be on the order of 5 to 8 bits or so depending on the required accuracy.

Example Data Encoding Schemes

As described previously, data can be encoded in a transmission from the MT to the RL. The data can be encoded using one or more modulation techniques, including but not limited to transmission time modulation, transmission phase angle modulation, a transmission frequency modulation, and/or sample rotation modulation of the Sample Reference Pattern.

In transmission time modulation, the MT can be configured to encode data in the transmission of a Sample Reference Pattern by modulating (i.e., adjusting or varying) a time offset to the transmission time (e.g., by a sample sequence rotator) of the signal transmission relative to an expected transmission time. Instead of transmitting the reply transmission (i.e. the third reply sequence) after Delay D3, the expected transmission time, the reply transmission can be transmitted by the MT after an offset amount relative to Delay D3. The amount of offset relative to Delay D3 can correspond to the transmitted data. The RL can be configured to capture samples of the reply transmission about the expected correlation time, determine an actual correlation time (e.g., a time-stamp) for when a correlation is determined from the captured samples, calculate a time delay offset as a difference between the actual correlation time and the expected correlation time (i.e., Delay D3), and decode the data from the time delay offset.

In transmission phase angle modulation, the MT can be configured to encode data in the transmission of a Sample Reference Pattern by statically adjusting the rotational phase angle (e.g., by a phase angle modulator) of the transmission by a fixed amount relative to an expected transmission phase angle. Instead of transmitting the reply transmission (i.e. the third reply sequence) after Delay D3 at an expected phase angle, the reply transmission can be transmitted by the MT after an offset phase angle that is offset by either 0 degrees, 90 degrees, 180 degrees, or 270 degrees (–90 degrees). Since one of four static phase angles are available, the phase angle modulation can correspond to two (2) data bits. The RL can be configured to capture samples of the reply transmission, determine an actual phase angle for when a correlation is determined from the captured samples, calculate a phase angle offset as a difference between the actual phase angle and an expected phase angle, and decode the data from the difference in the phase angle.

In transmission frequency modulation, the MT can be configured to encode data in the transmission of a Sample Reference Pattern by statically adjusting the carrier frequency (e.g., by a frequency modulator) of the transmission by a fixed amount relative to an expected transmission frequency. Instead of transmitting the reply transmission at an expected frequency, the reply transmission can be transmitted by the MT with an intentionally introduced frequency offset. The RL can be configured to capture samples of the reply transmission, determine an actual frequency for when a correlation is determined from the captured samples, calculate a frequency offset as a difference between the actual frequency and an expected frequency, and decode the data from the difference in the frequency.

In sample rotation modulation, the MT can be configured to encode data in the transmission of a Sample Reference Pattern by rotating (e.g., by a sample sequence rotator) the order of transmission of the samples from Sample Reference Pattern. The RL can be configured to capture samples of the reply transmission, determine a rotational position for Sample Reference Pattern when a correlation is determined from the captured samples, and decode the data from the rotational position of Sample Reference Pattern.

Example Timing Acquisition Sequence

FIGS. 4A and 4B are diagrams illustrating the timing acquisition for an example communication system. The described timing acquisition sequence may be employed by the MT when receiving the three-part transmission sequence described previously. However, as described herein, the timing acquisition sequence can be accomplished with only two of the three portions of the transmission sequence (e.g., sequence A and sequence B).

The receiver frequency can be digitally synthesized from a locally generated clock circuit (e.g., a crystal oscillator). The carrier wave from the RL is also digitally synthesized from its own locally generated clocking circuits, and will likely be mismatched from the receiver frequency in the MT. The mismatch may be related to thermal differences in the operating environment, heat transients in the circuits, crystal tolerances, processing differences between the MT and the RL, as well as other non-ideal effects. Moreover, the overall system is not synchronized so there is no way to initially know the starting phase, frequency and cadence associated with the transmissions. FIG. 4A illustrates examples of phase and frequency determinations associated with an example "pattern A" sequence, while FIG. 4B illustrates the uncertainty in the receiver frequency over time during the timing acquisition.

At time $t=t_1$, the receiver portion of the communication system is initialized to an initial frequency (f) that is designated as $f=f_0$. However, the difference between the digitally synthesized receiver frequency and the actual carrier frequency (i.e. the frequency offset) from the received transmission is unknown (i.e., $f_{offset1}=?$) at time $t=t_1$. The MT is arranged to measure the phase associated with the received signals from pattern A as phase $\phi_1$. The phase measurement (e.g., $\phi_1$) can be generated by an output of the correlator.

At time $t=t_2$, another portion of the transmission of pattern A is received, and the MT is arranged to measure the phase as $\phi_2$, and calculate a frequency offset error associated with the difference between the expected receiver frequency and the actual carrier wave from the RL's transmission. The frequency offset ($f_{offset2}$) is determined by the difference in the phases and the elapsed time between transmissions as: $f_{offset2}=[\phi_2-\phi_{ex2}]/[360\times(t_2-t_1)]$, where $\phi_{ex2}$ corresponds to the expected phase at time $t=t_2$. It is important to note that the time between the first two measurements should be short enough to result in an expected relative phase difference of substantially less than 180 degrees to ensure that unresolvable ambiguities do not occur. The expected phase is based on a reception interval for an integer period of frames that is reasonable based on expected transmission/reception time intervals. Notice that the expected phase for time $t=t_2$ corresponds to $\phi_1$.

At time $t=t_3$, another portion of the transmission of pattern A is received, and the MT is arranged to measure the phase as $\phi_3$, and calculate a frequency offset error associated with the difference between the expected receiver frequency and the actual carrier wave from the RL's transmission. The frequency offset ($f_{offset3}$) is determined by the difference in the phases and the elapsed time between transmissions as: $f_{offset2}=[\phi_3-\phi_{ex3}]/[360\times(t_3-t_2)]$, where $\phi_{ex3}$ corresponds to the expected phase at time $t_3$. The expected phase is again based on a reception interval for an integer period of frames that is reasonable based on expected transmission/reception time intervals. It is important to note that the elapsed time for the first two measurements should again result in an expected relative phase difference of substantially less than 180 degrees to ensure that unresolveable ambiguities do not occur. However, the absolute phase difference is expected to be significantly larger than 360 degrees such that the time difference between successive offset calculations can be gradually spaced further and further apart as the timing acquisition is adjusted by each subsequent estimate. Notice that the frequency error is gradually reduced with each subsequent adjustment until limited by the Allan Variance.

FIG. 4B is a graph illustrating the uncertainty in the digitally synthesized receiver frequency over an elapsed timing acquisition period. Note that the scale for both axes is logarithmic, and that the uncertainty will asymptotically approach the Allan Variance associated with the crystal oscillators in the MT and the RL. The horizontal axis illustrates elapsed time, while the vertical axis illustrates the uncertainty in the frequency. Each successive time period has a refined estimate of the receiver timing such that the uncertainty decreases in an exponential fashion. A knee in the uncertainty curve occurs after sufficient samples of the received signal are acquired (e.g., at time $t_5$) such that estimates for the received carrier wave frequency asymptotically approach a minimum uncertainty that is determined by the Allan variance.

Example Receiver

Figure 5A:
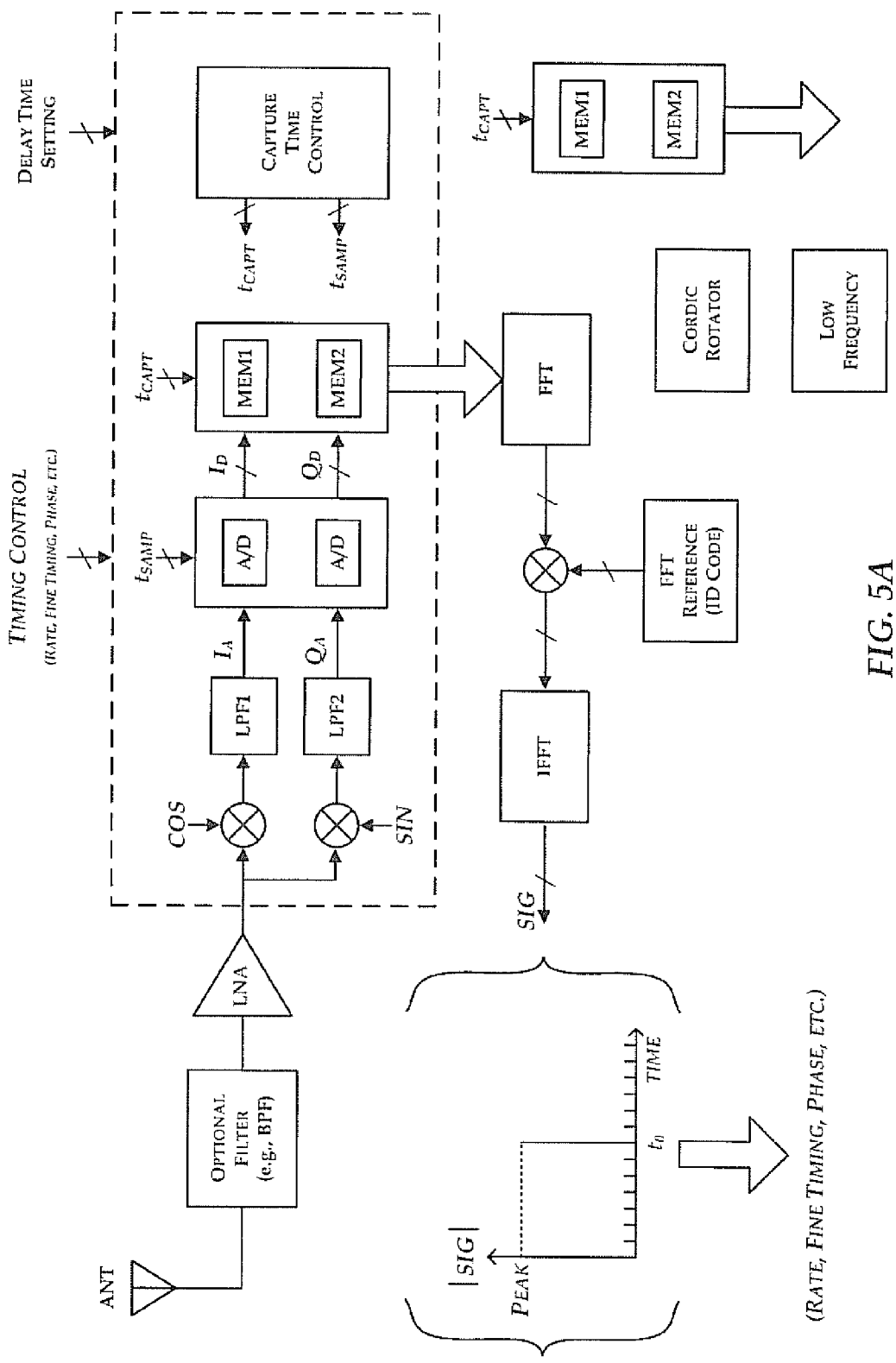
FIGS. 5A-5B illustrate various portions of an example receiver.

FIG. 5A is a block diagram for an example receiver. The example receiver includes a capture time control block, an antenna (ANT), an optional filter, a low noise amplifier (LNA), a first mixer, a second mixer, a first low pass filter (LPF1), a second low pass filter (LPF2), an analog-to-digital converter (ADC), a buffer, an FFT processor, a correlator, and an inverse EFT processor. Other example receivers can use an analog storage method with delayed use of the ADC.

The antenna is arranged to couple received signals to the LNA through the optional filter (e.g., a band-pass filter). The LNA is arranged to increase signal strength, and couple the increased signal to the mixers. The first mixer is arranged to generate an in-phase signal (I) with a cosine wave heterodyne, while the second mixer is arranged to generate quadrature signal (Q) with a sine wave heterodyne. The in-phase signal is coupled to the ADC via LPF1 as signal $I_A$, while the quadrature-phase signal is coupled to the ADC via LPF2 as signal $Q_A$. The ADC is configured to convert the analog values of signals $I_A$ and $Q_A$ to quantized digital signals, which are coupled to the buffer as signals $I_D$ and $Q_D$, respectively. An output of the buffer is coupled to the FFT processor. When a sufficient number of quantized digital signals are stored in the buffer, the output of the buffer can couple the digital signals to the FFT processor, which can convert the digital time domain signals into the frequency domain. An output of the FFT processor is coupled to a complex conjugate multiplier, which is configured to complex conjugate multiply the frequency domain representation of the captured signal from the FFT processor with an FFT of a reference signal (FFT Reference). An output (or product) of the complex conjugate multiplier is coupled to an inverse FFT (IFFT) processor, which is configured to convert the product into a time domain signal, SIG.

The time domain signal corresponds to the circular correlation of the captured signal with the selected reference signal. Since the FFT reference is determined from the unique identifier of a MT (e.g., MT ID Code), the correlation of the FFT processor output (e.g., SIG) will peak at a particular time (e.g., $t_0$) when a valid received code is identified in the captured samples of the received signal. The carrier phase and pattern timing can also be extracted from the timing of the received signals when a correlation peak is detected.

The ADC can be operated with a first timing signal ($t_{SAMP}$) from the capture time control, where the first timing signal ($t_{SAMP}$) corresponds to a sampling frequency ($f_{SAMP}$). In some examples, the ADC can be implemented as a single A/D converter circuit that is configured to time division multiplexing between converting the $I_A$ and $Q_A$ signals to their respective quantized digital values. The ADC can alternatively be implemented as two separate A/D converter circuits such that time division multiplexing may not be required.

The buffer can be operated with a second timing ($t_{CAPT}$) from the capture time control, where the second timing signal ($t_{CAPT}$) corresponds to a sampling frequency ($f_{CAPT}$) that in some examples may be different from the sampling frequency ($f_{SAMP}$) of the ADC. The buffer can be implemented as one contiguous memory, as logically or physically partitioned memory (e.g., separate partitions for MEM1, MEM2, etc.), or any other appropriate temporary storage that can be adapted to buffer the captured data.

Figure 5B:
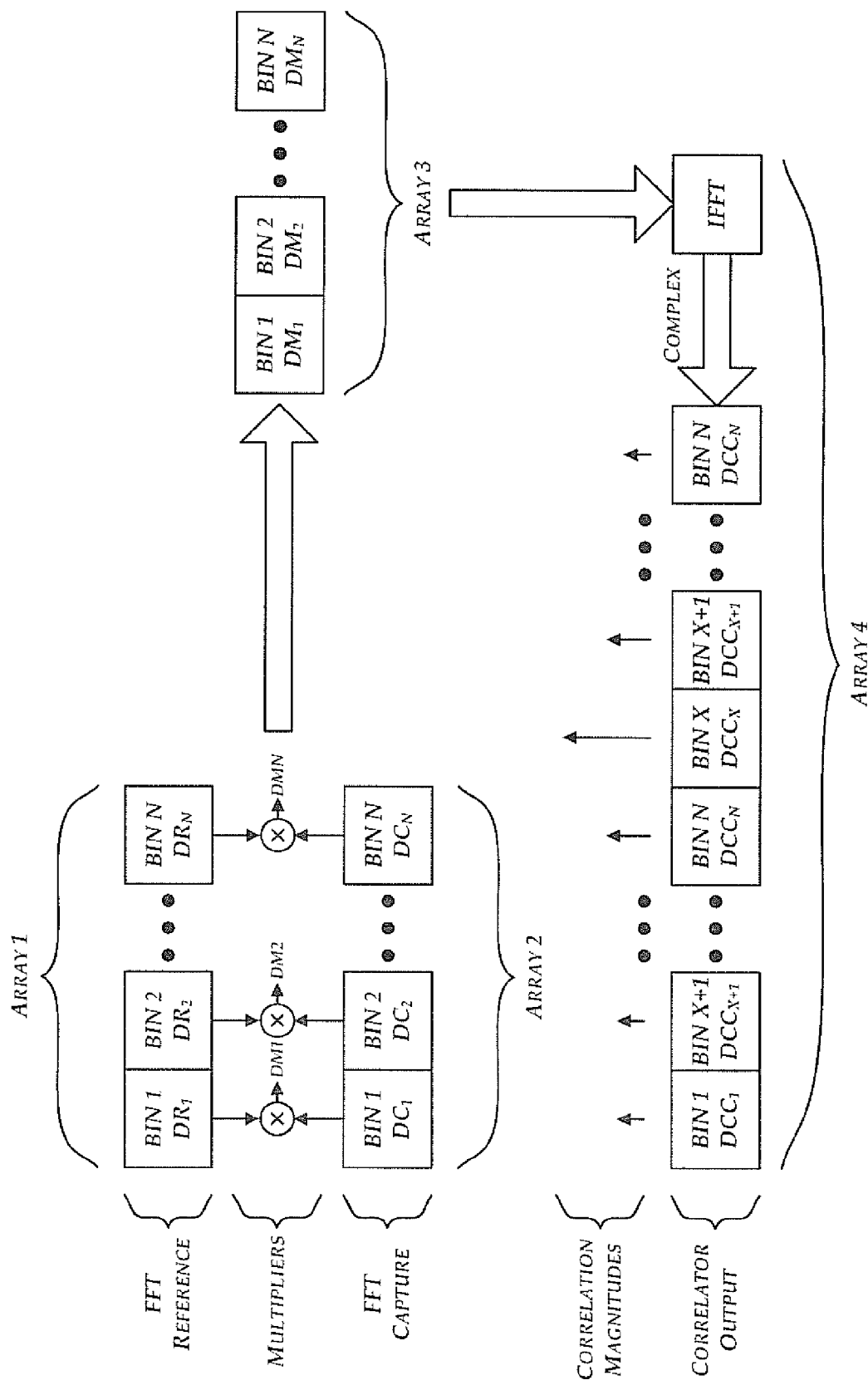

FIG. 5B illustrates operations in a receiver that may be performed as a DSP block. The FFT reference signal can be provided as an array of N-bins. The captured signal can be calculated as an FFT, also of N bins. Next, the complex conjugate of each complex element in a designated storage bin (BIN 1-BIN N) can be multiplied by the data from the other corresponding storage bin. For example, the complex conjugate of the FFT reference signal is stored in a first array (ARRAY 1) as $D_{R1}$-$D_{RN}$, and the FFT capture data is stored in a second array (ARRAY 2) as $D_{C1}$-$D_{CN}$. In another example, the FFT reference signal is stored in the first array (ARRAY 1) as $D_{R1}$-$D_{RN}$, and the complex conjugate of the FFT capture data is stored in the second array (ARRAY 2) as $D_{C1}$-$D_{CN}$.

The multipliers are arranged to receive data from the first array and the second array to provide a multiplied output, yielding a product result that can be stored in a third array (ARRAY 3) as $D_{M1}$-$D_{MN}$. An inverse FFT is computed from the product identified in the third array (ARRAY 3), to retrieve the circular correlator output. The circular correlator output results can be stored in a fourth array (ARRAY 4), or can optionally overwrite the values from the third array (ARRAY 3). The contents of the fourth array (ARRAY 4), or the third array depending on the implementation, are a complex result that includes both magnitudes and phases. As illustrated in FIG. 5B, the inverse FFT of the circular correlator output has a peak magnitude (PEAK) that occurs when the FFT reference and the captured data correlate with one another. Each bin (BIN1-BIN N) of the third array (ARRAY 3), or fourth array depending on the implementation, corresponds to the output of the correlator, wherein a PEAK may be located in one of the bins (e.g., BINX), when a correlation occurs. The BIN numbers correspond to a particular rotation or phase angle associated with the correlator output.

FIGS. 5C-5D are diagrams illustrating example correlation peaks for an example receiver in accordance with various aspects described herein. As illustrated in FIG. 5C, a correlation peak may occur between times of $t_1$ and $t_2$. However, as shown in FIG. 5D, there are a number of possible correlation peaks that may correspond to the same phase. For example, a 915 MHz carrier wave has a period of approximately 1.093 nano-seconds. The phase of the carrier wave at the time of a correlation peak in this example corresponds to about 70% of the time interval ($t_1$ to $t_2$) or about 252 degrees. This phase determination becomes useful when the signal-to-noise ratios at the MT and at the RL are sufficiently great to allow the selection of a particular carrier cycle. Since a carrier cycle at 915 MHz for instance is a distance of about 33 centimeters, the distance determination without carrier phase identification must be accurate to about 33 centimeters to allow selection of a particular carrier phase. For example, 100 cycles of a 915 MHz carrier wave corresponds to a distance of about 32.8 meters). Distance measurements can then be refined in accuracy to within a small fraction of a carrier cycle (a centimeter or two) using the phase information. For example, a phase of 252 degrees corresponds to a distance of about 23 centimeters for a carrier frequency of 915 MHz. Thus, the described system has two accuracy states, one for the number of cycles that occur before a correlation peak is found, and one for the precise phase of the carrier signal when the correlation peak is detected. For example, 100 cycles of a 915

MHz carrier wave with a detected phase of 252 degrees corresponds to about 33 meters of distance. When multiple independent distance estimates resulting from interrogations by several remote locator are consolidated together, the distance estimates can be improved often to the point where the phase navigating, interferometric based measurements becomes possible with exceptional accuracy.

Example Operational Flow for Interrogation Signal Transmission

Figure 6:
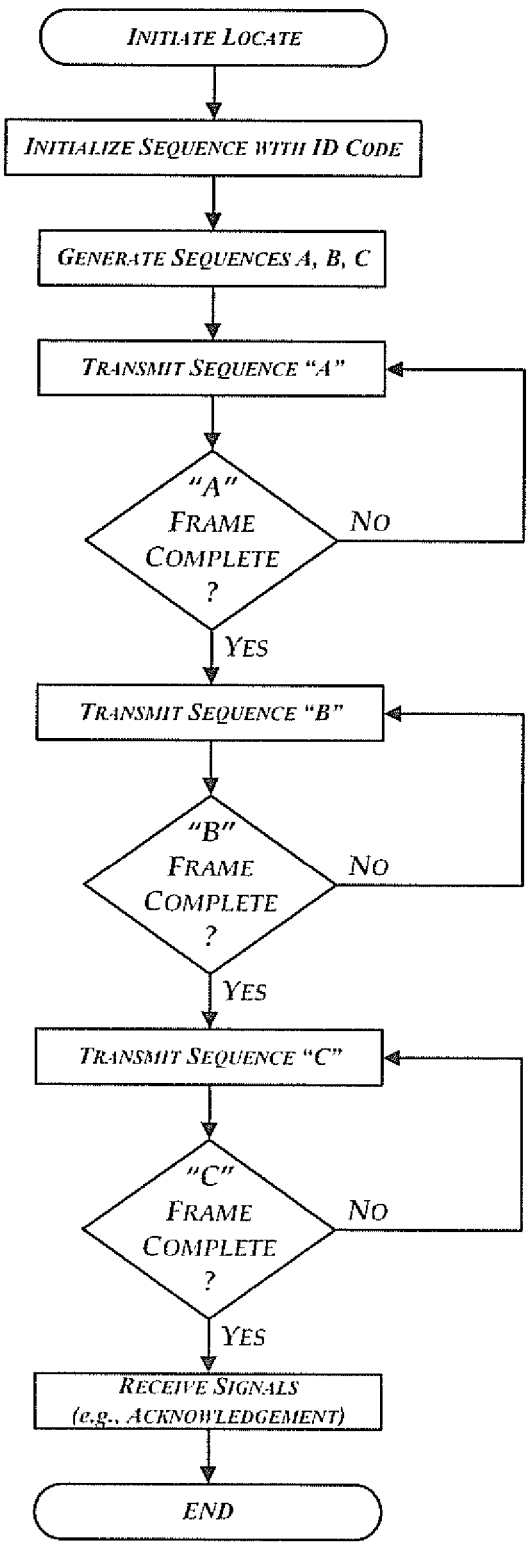
FIG. 6 is a flow-chart for an example transmitter.

FIG. 6 is a flow chart for an example transmission of an interrogation signal, which may be implemented in an RL. In an unsecure communication mode, the MT may also be adapted to implement transmission of the A, B and C sequences illustrated by the flow chart of FIG. 6. Processing begins when a user, or some other process, initiates a request to locate a particular MT.

A transmission sequence for an interrogation signal is initialized with a unique identifier (ID Code). Sequences are generated for frame transmission such as sequence "A", "B", and "C" as previously described. Each of the "A", "B", and "C" sequences consists of bauds that are encoded with a portion of the unique code.

Next, the RL (or MT) then begins transmitting pattern "A", and repeats transmitting pattern "A" (Note: un-shifted) until the entire "A" sequence is completed (e.g., 13×1024 sequential patterns, or frame "A"), or the equivalent time has expired for transmitting the pattern "A" frame in the case of hollowed frames. The RL then begins transmitting pattern "B". For each subsequent transmission of pattern "B", the pattern is shifted such as using a bit rotation algorithm, as previously described. After the entire sequence of "B" patterns is transmitted (e.g., 2000 sequential patterns, or frame "B"), or the equivalent time has expired for transmitting the pattern "B" frame in the case of hollowed frames, the RL begins transmitting the "C" pattern. The sequence of "C" patterns includes modulated data that may correspond to command and control information for the MT. After the modulated data is transmitted (e.g., 64 sequential pattern, or frame "C"), or the equivalent time has expired for transmitting the pattern "A" frame in the case of hollowed frames, the RL stops transmitting and switches into a receive mode.

In the receive mode for unsecure communications, signals can be received from the MT with the RL in a similar format as provided between the RL and the MT. In the receive mode for secure communications, the MT transmits the noise patterns at the previously determined time delays as is illustrated by FIGS. 3B and 3C. Upon receipt of the communications from the MT to the RL, the RL can then calculate a distance and location based on the round-trip time and Doppler shift in the received signals as previously described. Moreover, data that is communicated between the MT and the RL can be extracted and evaluated by the RL. Such data may include: any variety of information including but not limited to physiological information such as heart rate, body temperature, blood pressure, heart rhythm, blood-sugar level, as well as other sensory information that is associated with a user of the MT.

Figure 7:
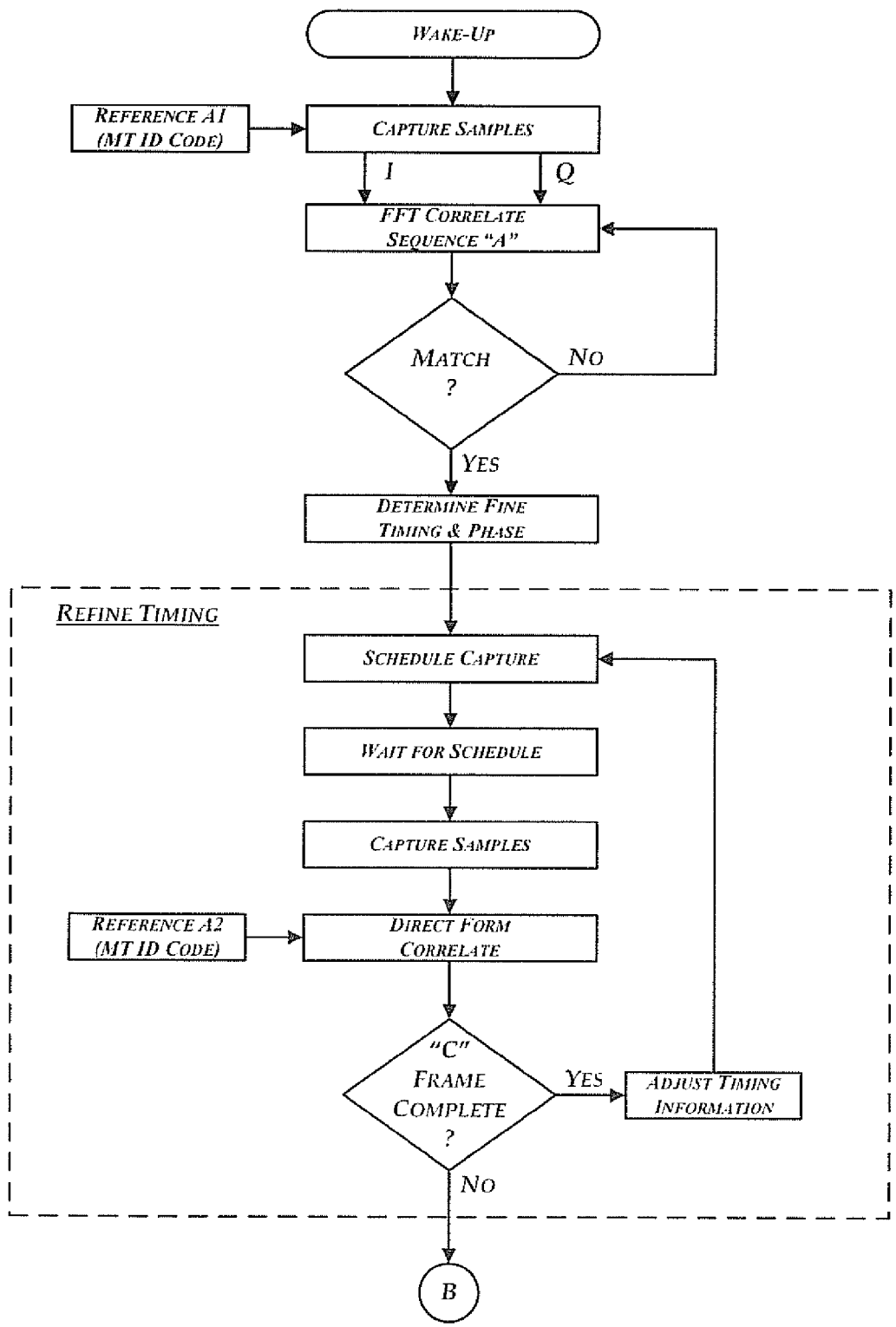
FIGS. 7, 8, and 9 are flow-charts for example receivers.

FIG. 7 is an example flow chart for an example receiver in a MT configured to capture samples of a signal spectrum when searching for an interrogation signal. Processing begins when the MT is activated out of a sleep mode (e.g., WAKE-UP is initiated). FIG. 7 illustrates that the captured samples may be associated with the transmission of sequence "A" (or frame "A") from an interrogation signal. After wake-up is initiated, the receiver captures samples of noise and/or signals from the signal spectrum. The MT will attempt to correlate the captured samples with an expected transmission sequence that is encoded with the first portion of the unique identifier for the specific MT (e.g., MT ID Code). When the correlation fails to match, the MT determines that the transmission is intended for another device, or possibly that no transmission is present, and returns to a sleep mode. Alternatively, the MT extracts baud and carrier timing information from the transmission sequence to refine the receiver timings in accordance with the various techniques described herein.

Figure 8:
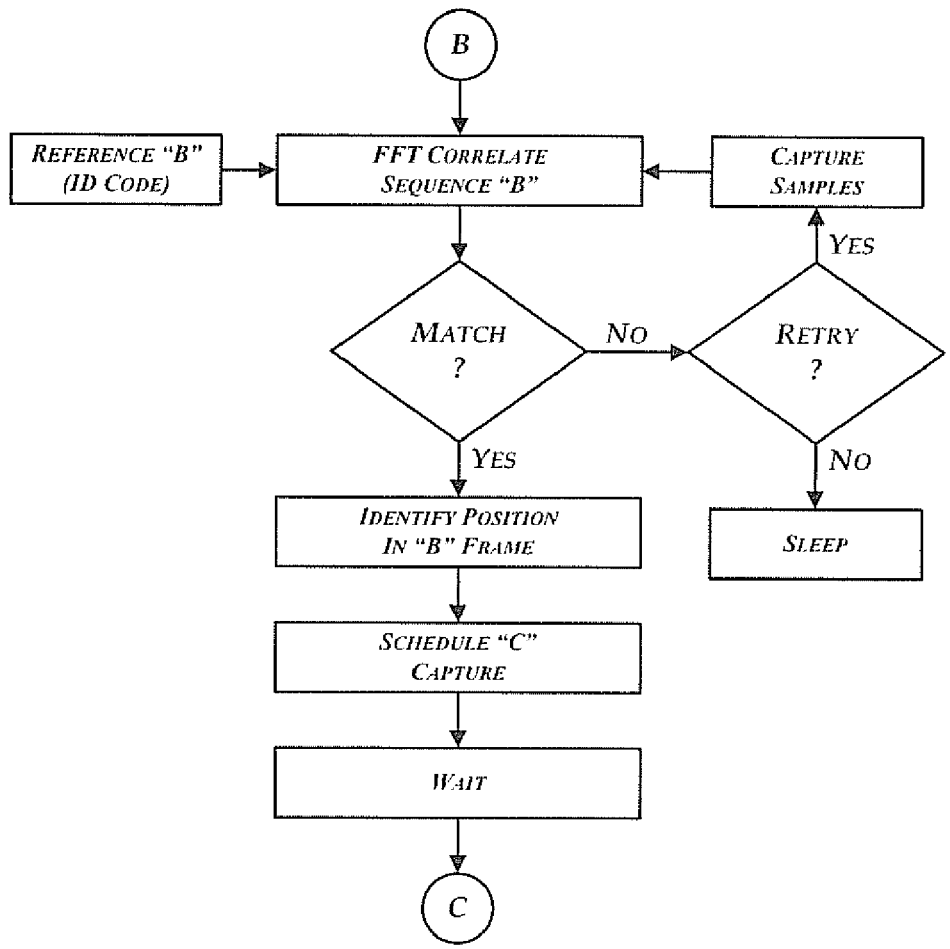

Timing can be refined by repeatedly scheduling capture intervals. The receiver waits, and then begins capturing samples of the signal spectrum and attempts to correlate the captured samples with an expected transmission sequence that is encoded with another portion of the reference (e.g., additional portions of sequence A) that is keyed to the code for the MT (e.g., MT ID Code). Each time the correlation indicates a match, the timing for the receiver can be adjusted (bootstrapped) to further refine the time/frequency estimates. Eventually, the correlation of pattern A fails to match the coded reference and processing may continue to capture and evaluate pattern B as will be described with respect to FIG. 8.

FIG. 5 illustrates the capture of samples associated with pattern "B" of an interrogation signal in a MT device. Using the timing adjustments from correction of pattern/sequence "A', the receiver captures samples, assuming the samples correspond to sequence "B". The MT will attempt to FFT correlate the captured samples with an expected second transmission that is encoded with the second portion of the unique identifier for the specific MT. When the correlation fails to identify a match, the MT may determine that the signal sequence is intended for another device. During a processing time interval, the expected B sequence is shifted and captured, and FFT correlation determinations then follow. When the processing time interval completes without a match of sequence "B", the MT determines that the transmission is intended for another MT or that there is no transmission to receive and returns to a sleep mode. Alternatively, if the MT finds a match (i.e. a correlation of the pattern with the captured samples) for sequence "B", then the MT can determine the relative position of the matched pattern within the sequence (or within the frame) based on the shift position that yields a correlation match. Since the timing, phase, and frequency information are now known, the MT schedules reception of the "C" sequence. Processing continues for the MT in FIG. 9, which follows further below.

Figure 9:
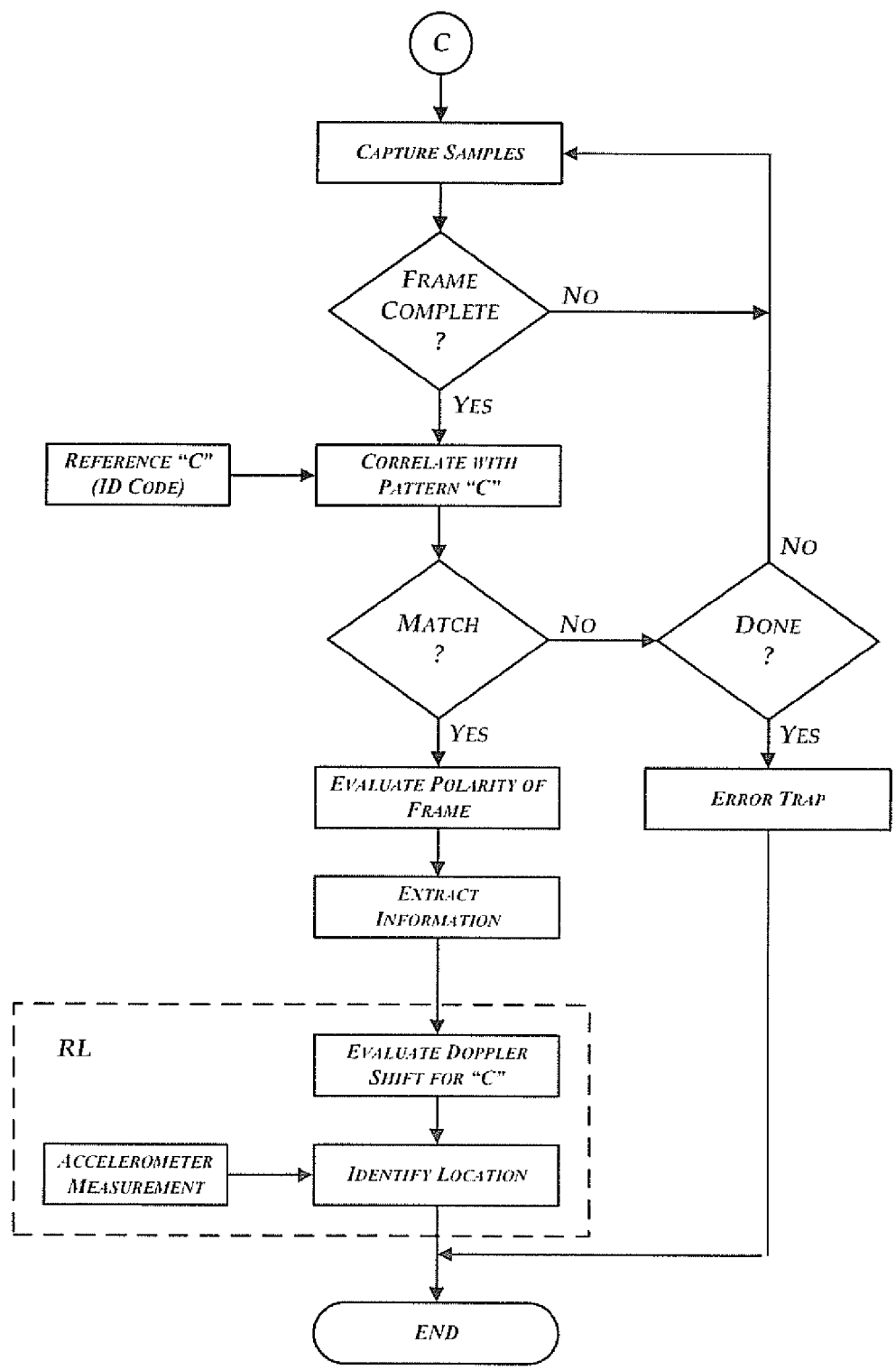

FIG. 9 illustrates the capture of samples associated with sequence "C" of a reply sequence transmission from an MT to an RL in an unsecure communication mode. The receiver of the RL is configured to captures samples of symbols in a signal transmission, assuming those symbols correspond to pattern "C". The MT will continue to capture samples of the signal spectrum until the frame is expected to reach completion. The MT will then attempt to correlate the captured samples (assuming the samples correspond to sequence "C" from the RL) with an expected third transmission that is encoded with the third portion of the unique identifier for the specific MT. When the correlation fails to achieve a sufficient level for detecting a match, we can assume as a formality that the transmission of the "C" sequence has failed for any number of reasons (excessive noise in the environment, a high strength interfering signal, etc.) Since we know precisely when transmission of sequence "C" should occur, and what carrier frequency, phase, timing, and cadence for which transmission should occur, the receipt of the "C" pattern can be used formalistically for verification of a valid transmission.

Sequence "C" may include data modulated therein that may be coded with error correcting codes (ECC), where the coded information can be phase modulated and subsequently demodulated and decoded. When the time-period has not expired, capturing of the expected C sequence is resumed, followed by correlation determinations again. When the time-period has expired without a match of sequence "C", the MT determines that the transmission is intended for another and traps an error condition appropriately. Alternatively, the MT finds a match for pattern "C" and evaluates the polarities of the symbols received in this frame, and extracts command and control information from the "C" sequence.

In the case of the MT, in an unsecure communication mode, the completed capture of sequence C is followed by a transmission of sequences "A", "B", and "C2" (or some other order, perhaps, or even a different set of A'B'C'. Sequences "A" and "B" include a similar pattern as previously described for the RE, although shorter in length. Sequence "C2" is still the same number of frames except that data is encoded into the transmission for communication between the MT and the RL.

In the case of the RL, in an unsecure communication mode, the completed capture of sequence C is followed by evaluation of the round-trip time to determine linear distance from the RL to the MT. A time difference is evaluated between the reception of two signals that are received from two different receiving antennas to help identify a vector for direction between the RL and the MT. An analysis of a Doppler shift in the received signals from the MT can also be used to assist in the determination of the directional vector. In addition, sequence "C" is evaluated to extract transferred information from the MT to the RL. Moreover, measurements from an accelerometer and/or compass sensor can be utilized to assist in determining location.

The presently described techniques take advantage of the acquired frequency knowledge to allow for synthesis of a time and phase coherent response to accurately determine location with a low-power MT. Although the preceding description describes various embodiments of the system, the invention is not limited to such embodiments, but rather covers all modifications, alternatives, and equivalents that fall within the spirit and scope of the invention. For example, the positioning of the various components may be varied, the functions of multiple components can be combined, individual components may be separated into different components, or components can be substituted as understood in the art. Since many embodiments of the invention can be made without departing from the spirit and scope of the invention, the invention is not limited except as by the appended claims.

While various aspects and embodiments have been disclosed herein, other aspects and embodiments will be apparent to those skilled in the art. The various aspects and embodiments disclosed herein are for purposes of illustration and are not intended to be limiting, the true scope and spirit being indicated by the following claims.

I claim:

1. A method for locating a transponder (MT) with a remote locator (RL), the method comprising:
   transmitting, by the RL, an interrogation signal including an interrogation sequence that is encoded with a specific identifier associated with the MT;
   capturing, by the MT, samples associated with the interrogation signal with a receiver in the MT;
   determining, by the MT, that the captured samples correspond to the interrogation signal encoded with the specific identifier associated with the MT, and if the interrogation signal is determined to be encoded with the specific identifier associated with the MT:
      determining, by the MT, a quantized Doppler measurement associated with the interrogation signal,
      adjusting, by the MT, transmission characteristics of a transmitter in the MT with the quantized Doppler measurement such that twice the quantized Doppler measurement is effectively subtracted from the carver frequency and cadence of the transmitter,
      selecting, by the MT, a reply sequence for transmission,
      encoding, by the MT, a Doppler compensation factor in a coded message for transmission in at least a portion of the reply sequence, and
      transmitting, by the MT, the reply sequence with the coded message as a reply signal;
   capturing, by the RL, samples associated with the reply signal with a receiver in the RL;
   determining, by the RL, that the captured samples correspond to the reply signal from the MT; and
   when the reply signal is determined to be from the MT:
      extracting, by the RL, the Doppler compensation factor from the coded message associated with the reply signal,
      determining, by the RL, a Doppler shift associated with the reply signal using the Doppler compensation factor extracted from the coded message, and
      determining a direction from the RL to the MT based on the determined Doppler shift associated with the reply signal.

2. The method of claim 1, further comprising: determining, by the RL, a distance between the RL and the MT based on the roundtrip time of flight between the transmission of the interrogation signal and the receipt of the reply signal.

3. The method of claim 2, further comprising: determining a location associated with the MT based on a known location of the RL and the determined direction and distance from the RL to the MT.

4. The method of claim 1, wherein adjusting the transmission characteristics of the transmitter in the MT comprises adjusting one or more of a timing, phase, cadence, or frequency associated with the transmission by the transmitter in the MT.

5. The method of claim 1, wherein encoding the Doppler compensation factor in the coded message comprises encoding the reply signal with one or more of a transmission time modulation, a transmission phase angle modulation, transmission frequency modulation, and/or a sample rotation of the reply sequence.

6. The method of claim 1, wherein determining that the captured samples from the receiver in the MT correspond to the interrogation signal comprises identifying a correlation of the captured samples from the receiver in the MT with a reference pattern that is coded with an identifier associated with the MT.

7. The method of claim 1, wherein determining that the captured samples from the receiver in the RL correspond to the reply signal comprises identifying a correlation of the captured samples from the receiver in the RL with a reference pattern that is coded with an identifier associated with the MT.

8. The method of claim 1, wherein determining the quantized Doppler measurement associated with the interrogation signal comprises: estimating a Doppler shift associated with the receipt of the interrogation signal using an internal oscillator associated with the MT, rounding the estimated Doppler shift to an integer value that corresponds to a fixed number of bits of resolution to generate the quantized Doppler measurement.

9. The method of claim 8, wherein the fixed number of bits is in a range of four bits to nine bits.

10. The method of claim 1, wherein adjusting the transmission characteristics of the transmitter in the MT with the quantized Doppler measurement comprises at least offsetting a carrier frequency associated with the carrier wave of the transmitter in the MT such that twice the quantized Doppler measurement is effectively subtracted from the carrier wave of the transmitter, and twice a proportional factor is effectively subtracted from the cadence associated with the transmitter.

11. A method for a transponder (MT) to communicate with a remote locator (RL), the method comprising:
    capturing samples associated with an interrogation signal with a receiver in the MT;
    determining that the captured samples correspond to the interrogation signal encoded with the specific identifier associated with the MT;
    adjusting transmission characteristics of a transmitter in the MT for subsequent transmission from the MT to the RL; and
    when the interrogation signal is determined to be encoded with the specific identifier associated with the MT:
        determining a quantized Doppler measurement associated with the interrogation signal,
        adjusting transmission characteristics of the transmitter in the MT with the quantized Doppler measurement such that twice the quantized Doppler measurement is effectively subtracted from the carrier frequency and cadence of the transmitter,
        selecting a reply sequence for transmission,
        encoding a Doppler compensation factor in a coded message for transmission in at least a portion of the reply sequence, and
        transmitting the reply sequence with the coded message as a reply signal.

12. The method of claim 11, wherein adjusting the transmission characteristics of the transmitter in the MT comprises adjusting one or more of a timing, phase, cadence, or frequency associated with the transmission by the transmitter in the MT.

13. The method of claim 11, wherein encoding the Doppler compensation factor in the coded message comprises encoding the reply signal with one or more of a transmission time modulation, a transmission phase angle modulation, transmission frequency modulation, and/or a sample rotation of the reply sequence.

14. The method of claim 11, wherein determining that the captured samples from the receiver in the MT correspond to the interrogation signal comprises identifying a correlation of the captured samples from the receiver in the MT with a reference pattern that is coded with an identifier associated with the MT.

15. The method of claim 11, wherein determining the quantized Doppler measurement associated with the interrogation signal comprises: estimating a Doppler shift associated with the receipt of the interrogation signal using an internal oscillator associated with the MT, rounding the estimated Doppler shift to an integer value that corresponds to a fixed number of bits of resolution to generate the quantized Doppler measurement.

16. The method of claim 11, wherein adjusting the transmission characteristics of the transmitter in the MT with the quantized Doppler measurement comprises at least offsetting a carrier frequency associated with the carrier wave of the transmitter in the MT such that twice the quantized Doppler measurement is effectively subtracted from the carrier wave of the transmitter, and twice a proportional factor is effectively subtracted from the cadence associated with the transmitter.

17. A method for a remote locator (RL) to locate a transponder (MT), the method for the RL comprising:
    transmitting an interrogation signal with an interrogation sequence that is encoded with a specific identifier associated with the MT;
    capturing samples associated with a reply signal from the MT with a receiver in the RL, wherein the reply signal is pre-compensated such that a quantized Doppler measurement is effectively subtracted from the carrier frequency and cadence of the MT prior to transmission of the reply signal;
    determining that the captured samples correspond to the reply signal from the MT; and
    when the reply signal is determined to be from the MT:
        extracting a Doppler compensation factor from a coded message associated with the reply signal, wherein the Doppler compensation factor is associate with the quantized Doppler measurement, and
        determining a Doppler shift associated with the reply signal using the Doppler compensation factor extracted from the coded message, and
    determining a direction from the RL to the MT based on the determined Doppler shift associated with the reply signal.

18. The method of claim 17, further comprising: determining a distance between the RL and the MT based on the roundtrip time of flight between the transmission of the interrogation signal and the receipt of the reply signal.

19. The method of claim 18, further comprising: determining a location associated with the MT based on a known location of the RL and the determined direction and distance from the RL to the MT.

20. The method of claim 17, wherein extracting the Doppler compensation factor from the coded message comprises decoding one or more of decoding a transmission time modulation, decoding a transmission phase angle modulation, decoding a transmission frequency modulation, and/or decoding a sample rotation of the reply sequence.

21. The method of claim 17, wherein determining that the captured samples from the receiver in the RL correspond to the reply signal comprises identifying a correlation of the captured samples from the receiver in the RL with a reference pattern that is coded with an identifier associated with the MT.

22. A transponder (MT) adapted to communicate with a remote locator (RL), the MT comprising:
    a memory configured to store a complex reference pattern associated with an interrogation signal encoded with a specific identifier of the MT;
    a sequence generator configured to generate a reply transmission sequence;
    a transmitter configured to selectively transmit the reply transmission sequence as a reply signal transmission using digitally synthesized transmitter timing signals when a transmit signal is asserted, wherein the transmitter block includes a high rate Doppler adjust block that is adapted such that twice a quantized Doppler measurement is effectively subtracted from a carrier frequency and cadence of the reply signal transmission;
    a receiver configured to capture complex samples of a signal transmission spectrum using digitally synthesized receiver timing signals when a capture signal is asserted;
    a signal processor configured to evaluate complex captured samples from the receiver block, correlate the complex captured samples with the complex reference pattern to detect the interrogation signal, and determine the quantized Doppler measurement associated with the interrogation signal when the interrogation signal is detected;

a time controller configured to digitally synthesize timing signals for the transmitter block, the receiver block, and the baseband and signal processing block based on the carrier phase, frequency, cadence and timing determined from the detected interrogation signal; and a processor configured to:
- assert a capture signal after a wake-up interval;
- encode a Doppler compensation factor in a coded message for a reply signal, wherein the Doppler compensation factor is associated with the quantized Doppler shift determined for the interrogation signal; and
- assert the transmit signal after the processor identifies receipt of the interrogation signal to initiate transmission of the reply signal to an RL with the coded message.

23. The MT of claim 22, further comprising a sample sequence rotator that is coupled to the memory and the transmitter, and configured to encode the Doppler compensation factor in the reply signal transmission by rotating the order of transmission of samples in the complex reference pattern.

24. The MT of claim 22, further comprising an offset time modulator, wherein the offset time modulator is configured to the Doppler compensation factor in the reply signal transmission by adjusting a time offset to the transmission time of the reply signal transmission relative to an expected reply signal transmission time.

25. The MT of claim 22, further comprising an angle modulator in the transmitter block, wherein the angle modulator is configured to encode the Doppler compensation factor in the reply signal transmission by statically adjusting the rotational phase angle of the third transmission by a fixed amount relative to an expected transmission phase angle.

26. The MT of claim 22, further comprising a frequency modulator in the transmitter block, wherein the frequency modulator is configured to encode the Doppler compensation factor in the reply signal transmission by statically adjusting the carrier frequency of the reply signal transmission by a fixed amount relative to an expected reply signal transmission frequency.

27. The MT of claim 22, the baseband and signal processing block further comprising a correlator that is configured to correlate the complex reference pattern retrieved from the memory with the complex captured samples retrieved from the receiver.

28. The MT of claim 27, wherein the correlator includes a cyclic correlator and a frequency shifter, wherein the frequency shifter is configured to frequency shift one of the complex captured samples and the complex reference pattern prior to a trial correlation with the cyclic correlator.

29. The MT of claim 27, wherein the correlator includes a cyclic correlator and a frequency shift selector, wherein the cyclic correlator is configured in cooperation with the frequency shift selector such that previously frequency shifted versions of one of the complex captured samples and the complex reference pattern is retrieved from the memory block by the frequency shift selector prior to a trial correlation with the cyclic correlator.

30. The MT of claim 22, wherein the transmitter comprises a high rate Doppler adjust system that is configured to adjust a carrier frequency and cadence associated with the reply signal transmission.

31. A remote locator (RL) adapted to communicate with a transponder (MT), the RL comprising:
- a memory configured to store a complex reference pattern that is associated with a reply signal for an MT;
- a sequence generator configured to generate a transmission sequence that is encoded with a specific identifier associated with the MT;
- a transmitter configured to selectively transmit the transmission sequence as an interrogation signal transmission using digitally synthesized transmitter timing signals when a transmit signal is asserted;
- a receiver configured to selectively capture samples of a signal transmission spectrum using digitally synthesized receiver timing signals when the capture signal is asserted;
- a signal processor configured to evaluate complex captured samples from the receiver block, correlate the complex captured samples with the complex reference pattern to identify a reply transmission from the MT, and when the reply transmission is identified, extract a Doppler compensation factor from a coded message in the reply transmission, and determine a Doppler shift associated with the receipt of the reply signal transmission using the Doppler compensation factor; and
- a time controller configured to digitally synthesize timing signals for the transmitter, the receiver, and the signal processor; and
- a processor configured to:
  - assert the transmit signal to initiate the interrogation signal transmission;
  - assert a capture signal after the interrogation signal transmission is complete; and
  - determining a direction from the RL to the MT based on the determined Doppler shift associated with the reply signal.

32. The RL of claim 31, wherein the processor is further configured to determine a distance between the RL and the MT based on the roundtrip time of flight between the transmission of the interrogation signal and the receipt of the reply signal.

33. The RL of claim 32, wherein the processor is further configured to determine a location associated with the MT based on a known location of the RL and the determined direction and distance from the RL to the MT.

34. The RL of claim 31, wherein the signal processor is further configured to extract the Doppler compensation factor from the coded message by one or more of: decoding a transmission time modulation, decoding a transmission phase angle modulation, decoding a transmission frequency modulation, and/or decoding a sample rotation of the reply sequence.

35. The RL of claim 31, wherein the signal processor further comprises a correlator configured to correlate the complex captured samples with the complex reference pattern to identify a reply transmission from the MT.

36. The RL of claim 35, wherein the correlator includes a cyclic correlator and a frequency shifter, wherein the frequency shifter is configured to frequency shift one of the complex captured samples and the complex reference pattern prior to a trial correlation with the cyclic correlator.

37. The RL of claim 35, wherein the correlator includes a cyclic correlator and a frequency shift selector, wherein the cyclic correlator is configured in cooperation with the frequency shift selector such that previously frequency shifted versions of one of the complex captured samples and the complex reference pattern is retrieved from the memory block by the frequency shift selector prior to a trial correlation with the cyclic correlator.

38. A method for locating a transponder (MT) with a remote locator (RL), the method comprising:
- transmitting, by the RL, an interrogation signal including an interrogation sequence that is encoded with a specific identifier associated with the MT;
- capturing, by the MT, samples associated with the interrogation signal with a receiver in the MT;
- determining, by the MT, that the captured samples correspond to the interrogation signal encoded with the specific identifier associated with the MT, and if the interrogation signal is determined to be encoded with the specific identifier associated with the MT:
  - determining, by the MT, a quantized Doppler measurement associated with the interrogation signal,
  - adjusting, by the MT, transmission characteristics of a transmitter in the MT with the quantized Doppler measurement such that twice the quantized Doppler measurement is effectively subtracted from the carrier frequency and cadence of the transmitter,
  - selecting, by the MT, a reply sequence for transmission, and
  - transmitting the reply sequence as a coded message in a reply signal;
- capturing, by the RL, samples associated with the reply signal with a receiver in the RL;
- determining, by the RL, that the captured samples correspond to the reply signal from the MT; and
- when the reply signal is determined to be from the MT:
- extracting the reply sequence as a coded message.

39. A method of communicating between locator and transponder devices that are far apart or moving at a high relative velocity, comprising the steps of:
- receiving a signal at the transponder from the locator;
- estimating the Doppler shift of the signal at the transponder; and
- transmitting a return signal to the locator from the transponder with a reverse Doppler shifted transmission characteristic that pre-compensates for the Doppler shift.

40. The method of claim 39, wherein twice the estimated Doppler shift is subtracted from the carrier frequency and cadence of the return signal.

\* \* \* \* \*